US010118094B2

(12) United States Patent
Nishimura et al.

(10) Patent No.: US 10,118,094 B2
(45) Date of Patent: Nov. 6, 2018

(54) GAME MACHINE, CONTROL METHOD USED THEREFOR, AND A NON-TRANSITORY COMPUTER READABLE STORAGE MEDIUM STORING A COMPUTER PROGRAM

(71) Applicant: KONAMI DIGITAL ENTERTAINMENT CO., LTD., Tokyo (JP)

(72) Inventors: Yoshitaka Nishimura, Minato-ku (JP); Masahiro Kiyomoto, Minato-ku (JP); Shota Katagiri, Minato-ku (JP); Takao Yamamoto, Minato-ku (JP); Mayumi Okuyama, Minato-ku (JP); Tatsuya Iyama, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 407 days.

(21) Appl. No.: 14/356,767

(22) PCT Filed: Nov. 6, 2012

(86) PCT No.: PCT/JP2012/078758
§ 371 (c)(1),
(2) Date: May 7, 2014

(87) PCT Pub. No.: WO2013/069647
PCT Pub. Date: May 16, 2013

(65) Prior Publication Data
US 2014/0309034 A1 Oct. 16, 2014

(30) Foreign Application Priority Data
Nov. 9, 2011 (JP) ................. 2011-245908

(51) Int. Cl.
*A63F 13/31* (2014.01)
*A63F 13/30* (2014.01)

(52) U.S. Cl.
CPC .............. *A63F 13/31* (2014.09); *A63F 13/12* (2013.01); *A63F 2300/5533* (2013.01);
(Continued)

(58) Field of Classification Search
CPC .. A63F 13/31; A63F 13/12; A63F 2300/5533; A63F 2300/577; A63F 2300/646; A63F 2300/8047
See application file for complete search history.

(56) References Cited

U.S. PATENT DOCUMENTS

2002/0025842 A1* 2/2002 Nobe ....................... A63F 13/10
463/7
2010/0088604 A1* 4/2010 Miura ...................... A63F 13/10
715/727
(Continued)

FOREIGN PATENT DOCUMENTS

JP 2001-246167 A 9/2001
JP 2003-236243 A 8/2003
(Continued)

OTHER PUBLICATIONS

Japanese Office Action with English Translation—(JP 2011-245908)—dated Feb. 4, 2013.
International Search Report—dated Feb. 12, 2013.

Primary Examiner — Tramar Harper
Assistant Examiner — Jeffrey Wong
(74) Attorney, Agent, or Firm — Howard & Howard Attorneys PLLC

(57) ABSTRACT

Provided is a game machine which can actualize a play between games having different difficulty levels. The game machine is applied to a game system that progresses a game between game machines connected via a network. The game (Continued)

machine comprises an external storage that stores sequence data wherein each operation timing is written so as to differ from each other. And, the game machine: teaches each operation timing, based on sequence data that differs from sequence data used in another machine functioning as another terminal in the game system; obtains operation information for the other machine; and, based on it, determines whether or not prescribed reflection conditions have been fulfilled. Then, when the prescribed reflection conditions have been fulfilled based on its results, the game machine reflects the operation information for the other machine in a travel path for an object for teaching the operation timing for the game machine.

15 Claims, 13 Drawing Sheets

(52) U.S. Cl.
CPC ... *A63F 2300/577* (2013.01); *A63F 2300/646* (2013.01); *A63F 2300/8047* (2013.01)

(56) References Cited

U.S. PATENT DOCUMENTS

2011/0105227 A1\* 5/2011 Matsumoto ............. A63F 13/00
  463/30
2013/0040733 A1\* 2/2013 Yamamoto ............. A63F 13/06
  463/31

FOREIGN PATENT DOCUMENTS

JP WO 2011136303 A1 \* 11/2011 ............. A63F 13/06
WO 2011/136303 A1 11/2011

\* cited by examiner

Fig. 8

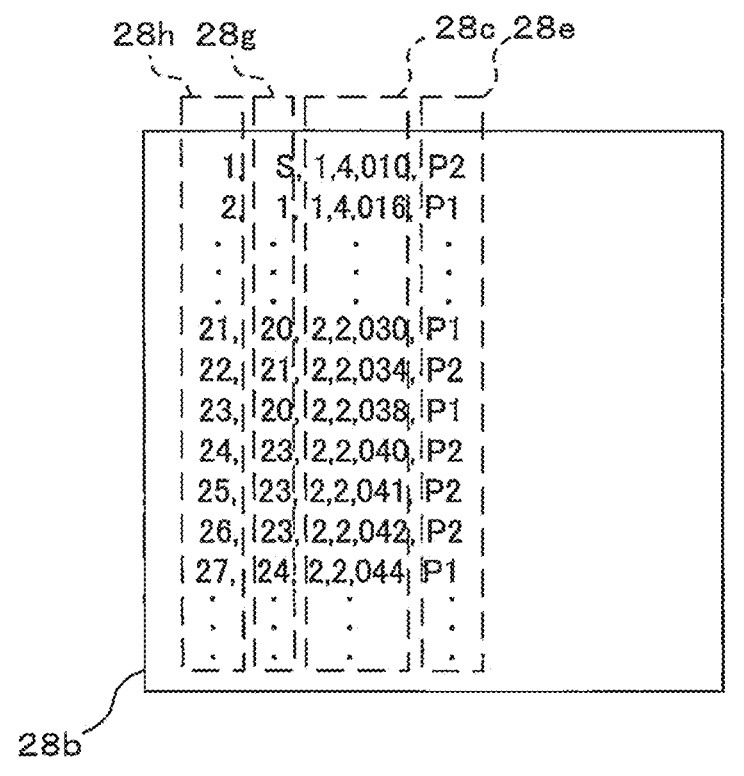

| 28h | 28g | | 28c | 28e |
|---|---|---|---|---|
| 1, | S, | 1,4,010, | P2 |
| 2, | 1, | 1,4,016, | P1 |
| . | . | . | . |
| . | . | . | . |
| 21, | 20, | 2,2,030, | P1 |
| 22, | 21, | 2,2,034, | P2 |
| 23, | 20, | 2,2,038, | P1 |
| 24, | 23, | 2,2,040, | P2 |
| 25, | 23, | 2,2,041, | P2 |
| 26, | 23, | 2,2,042, | P2 |
| 27, | 24, | 2,2,044, | P1 |
| . | . | . | . |
| . | . | . | . |

28b

GAME MACHINE, CONTROL METHOD USED THEREFOR, AND A NON-TRANSITORY COMPUTER READABLE STORAGE MEDIUM STORING A COMPUTER PROGRAM

CROSS REFERENCE TO RELATED APPLICATION

This application is a national stage application of PCT/JP2012/078758, filed Nov. 6, 2012, which claims priority to Japanese Patent Application No. 2011-245908, filed Nov. 9, 2011, the disclosures of which are hereby incorporated by reference in their entirety.

TECHNICAL FIELD

The present invention relates to a game machine that is applied to a game system which progresses a game between a plurality of terminals connected via a communication line, that can function as one of the plurality of terminals, and a control method used therefor and a non-transitory computer readable storage medium storing a computer program used thereof.

BACKGROUND ART

There are game machines in which a plurality of players alternately operates each operating unit in tune with a rhythm of music. Of the game machines, there has been known a game machine which is played by a plurality of players, and in which each player alternately operates each operating unit while deciding a next player to operate each operating unit through an operation of each operating unit (for example, see Patent Literature 1).

Patent Literature 1: Japanese Patent Application Laid-Open (JP-A) No. 2003-236243.

SUMMARY OF INVENTION

Technical Problem

In the game machine disclosed in Patent Literature 1, one player's operation result affects progress of the game of the other player directly. Therefore, the game progresses via the common game screen. In the game machine like this, there is not assumed a game which has to use a game screen different from opponents. As a game like this, for example, there is assumed a case which executes a game with difficulty level differing from opponents. That is, in the game machine disclosed in Patent Literature 1, a play using a game with different difficulty level cannot be actualized.

In this regard, an object of the present invention is to provide a game machine which can actualize a play between games having difficulty level differing from each other, a control method therefor, and a non-transitory computer readable storage medium storing a computer program.

Solution to Problem

A game machine of the present invention is a game machine which is applied to a game system progressing a game between a plurality of terminals connected through a communication line, based on play acts by a player of each terminal, and which is capable of functioning as one of the plurality of terminals, wherein the game machine comprises: a reference timing data storage device adapted and configured to store two or more pieces of reference timing data in which reference timings at which the play acts should be performed in the game are described so that contents of the reference timings differ from each other; a reference timing teaching device adapted and configured to teach the reference timings for own game machine, based on a piece of the reference timing data differing from a piece of the reference timing data used in another game machine functioning as another terminal of the game system, among the two or more pieces of reference timing data; an other machine information acquiring device adapted and configured to acquire other machine information relating to the play acts on the other game machine; and a condition determination device adapted and configured to determine whether or not a predetermined reflection condition has been met based on the other machine information acquired by the other machine information acquiring device, and wherein the reference timing teaching device reflects the other machine information to a teaching aspect for teaching the reference timings for the own game machine, when the predetermined reflection condition has been met based on a determination result of the condition determination device.

According to the present invention, there is provided a game using pieces of reference timing data differing between the own game machine and the other game machine. That is, the game having different contents progress between the own game machine and the other game machine. Due to this, it is possible to provide the game having different difficulty levels between the own game machine and the other game machine. Further, a result of one play act is reflected to a teaching aspect of reference timings of the other, between the own game machine and the other game machine using different reference data, using a predetermined reflection condition. That is, even if games having different difficulty levels are played, it is possible to use one play act for progress of the game of the other, using the predetermined reflection condition. Due to this, it is possible to actualize a play between games having different difficulty levels.

The contents of the two or more pieces reference timing data may differ from each other in any way. For example, in an aspect of the game machine according to the present invention, the two or more pieces of reference timing data may differ from each other, due to a difference of number of the described reference timings.

In an aspect of the game machine according to the present invention, the play acts may include two or more kinds of acts, the condition determination device may determine that the predetermined reflection condition has been met when number of specific kind of acts reaches at a predetermined number, based on the specific kind of acts among the two or more kinds of acts included in the other machine information. In this case, it is possible to use one specific kind of act as an act influencing the other.

In the aspect using predetermined number of specific kind of acts as the predetermined reflection condition, number according to a ratio between number of the reference timings described in the piece of the reference timing data used in the own game machine and number of the reference timings described in the piece of the reference timing data used in the other game machine may be used as the predetermined number. In this case, one specific kind of act is reflected to the progress of the game of the other at a ratio according to number of reference timings. When number of the reference timings is large, since this means that the play acts to be performed are many, the difficulty level is higher in many cases than the case in which number of that is little. That is, the difference of number of the reference timings relates to the difference of the difficulty level. Accordingly, in this case, it is possible to try to adjust the difference of the difficulty level more appropriately, since it is possible to reflect one specific kind of act to the other at a ratio according to the difficulty level of the game.

Any kind of acts may use as the specific kind of act. For example, in an aspect using the specific kind of act, acts of a case in which each play act is not executed by each player within predetermined time, or an inappropriate case as each play act may be used as each specific kind of act.

In an aspect of the game machine according to the present invention, the game machine may further comprise: an input apparatus including at least one operation unit for inputting the play acts; and a display apparatus that displays a game screen, wherein the reference timing data storage device may store two or more pieces of sequence data in which operation timings for the one operation unit are described as the reference timings so that contents of the operation timings differ from each other, as the two or more pieces of reference timing data, the other machine information acquiring device may acquire operation information for the one operation unit of the other game machine, as the other machine information, the condition determination device may determine whether or not the predetermined reflection condition has been met based on the operation information acquired by the other machine information acquiring device, wherein the reference timing teaching device may comprises; a game region presenting device adapted and configured to display a game region to which a plurality of reference portions arranged apart from each other are set, on the game screen, and a mark display control device adapted and configured to teach the operation timings, by displaying operation indication marks for indicating the operations on the one operating unit while moving the operation indication marks in the game region so that each operation indication mark arrives at at least one of the plurality of the reference portions along any one of moving paths connecting the reference portions with each other at each operation timing indicated by a piece of the sequence data differing from a piece of the sequence data used in the other game machine, and wherein the mark display control device may reflect the operation information of the other game machine to a teaching aspect for teaching the own operation timings, by using the operation information of the other game machine for selecting at least one moving path of at least one operation indication mark to be displayed on the own game machine when the predetermined reflection condition has been met, based on a determination result of the condition determination device. In this case, in a game in which operation indication marks move between reference portions for teaching operation timings, it is possible to actualize a play using sequence data having different difficulty levels between the own game machine and the other game machine.

In an aspect of the game machine according to the present invention, when a special operation indication mark displayed at a case in which a predetermined display condition has been met is displayed on the game screen of the other game machine as the operation indication mark, the mark display control device may display the special operation indication mark on the game screen of the own game machine as the operation indication mark corresponding to any one of the operation timings, and may reflect the operation information for the special operation indication mark on the other game machine to the special operation indication mark on the own game machine, separately from the predetermined reflection condition. In this case, it is possible to reflect operation information for one special operation indication mark to the moving path of the special operation indication mark of the other, separately from the different of the difficulty level. That is, it is possible to use one special operation indication mark as a means influencing the progress of the game directly.

In an aspect of the game machine according to the present invention, the game machine may further comprise: an audio output apparatus that reproduces and outputs a sound; a music data storage device adapted and configured to store music data used to reproduce music; and a music reproducing device adapted and configured to reproduce the music through the audio output apparatus based on the music data, and wherein timings in the music may be used as the reference timings. In this case, it is possible to actualize the play between the games having the different difficulty levels, in a music game.

A control method of controlling a computer of the present invention is a control method of controlling a computer incorporated into a game machine which is applied to a game system progressing a game between a plurality of terminals connected through a communication line, based on play acts by a player of each terminal, which is capable of functioning as one of the plurality of terminals, and which comprises a reference timing data storage device adapted and configured to store two or more pieces of reference timing data in which reference timings at which the play acts should be performed in the game are described so that contents of the reference timings differ from each other, and wherein the control method of controlling the computer comprises the steps: a reference timing teaching step that teaches the reference timings for own game machine, based on a piece of the reference timing data differing from a piece of the reference timing data used in another game machine functioning as another terminal of the game system, among the two or more pieces of reference timing data; an other machine information acquiring step that acquires other machine information relating to the play acts on the other game machine; and a condition determination step that determines whether or not a predetermined reflection condition has been met based on the other machine information acquired by the other machine information acquiring device, and wherein the reference timing teaching step further includes a step that reflects the other machine information to a teaching aspect for teaching the reference timings for the own game machine, when the predetermined reflection condition has been met based on a determination result of the condition determination device.

Further, a non-transitory computer readable storage medium storing a computer program for a game machine of the present invention is a computer program for a game machine which is applied to a game system progressing a game between a plurality of terminals connected through a communication line, based on play acts by a player of each terminal, which is capable of functioning as one of the plurality of terminals, and which comprises a reference timing data storage device adapted and configured to store two or more pieces of reference timing data in which reference timings at which the play acts should be performed in the game are described so that contents of the reference timings differ from each other, and wherein the computer program for the game machine is configured so as to cause a computer which is incorporated into the game machine to function as: a reference timing teaching device adapted and configured to teach the reference timings for own game machine, based on a piece of the reference timing data differing from a piece of the reference timing data used in another game machine functioning as another terminal of the game system, among the two or more pieces of reference timing data; an other machine information acquiring device adapted and configured to acquire other machine information relating to the play acts on the other game machine; and a condition determination device adapted and configured to determine whether or not a predetermined reflection condition has been met based on the other machine information acquired by the other machine information acquiring device, and wherein the computer program for the game machine is configured so as to cause the reference timing teaching device to further function as a device adapted and configured to reflect the other machine information to a teaching aspect for teaching the reference timings for the own game machine, when the predetermined reflection condition has been met based on a determination result of the condition determination device. It is possible to actualize a game machine of the present invention by executing the computer program or the control method of controlling a computer of the present invention.

Advantageous Effects of Invention

As described above, according to the present invention, there is provided a game using pieces of reference timing data differing between own game machine and the other game machine. That is, it is possible to provide the game having different difficulty levels between the own game machine and the other game machine. Further, even if games having different difficulty levels are played, it is possible to use one play act for progress of the game of the other, using the predetermined reflection condition. Due to this, it is possible to actualize a play between games having different difficulty levels.

BRIEF DESCRIPTION OF DRAWINGS

FIG. 8 is a diagram illustrating an example of contents of sequence data corresponding to high difficulty level.

DESCRIPTION OF EMBODIMENTS

Figure 1:
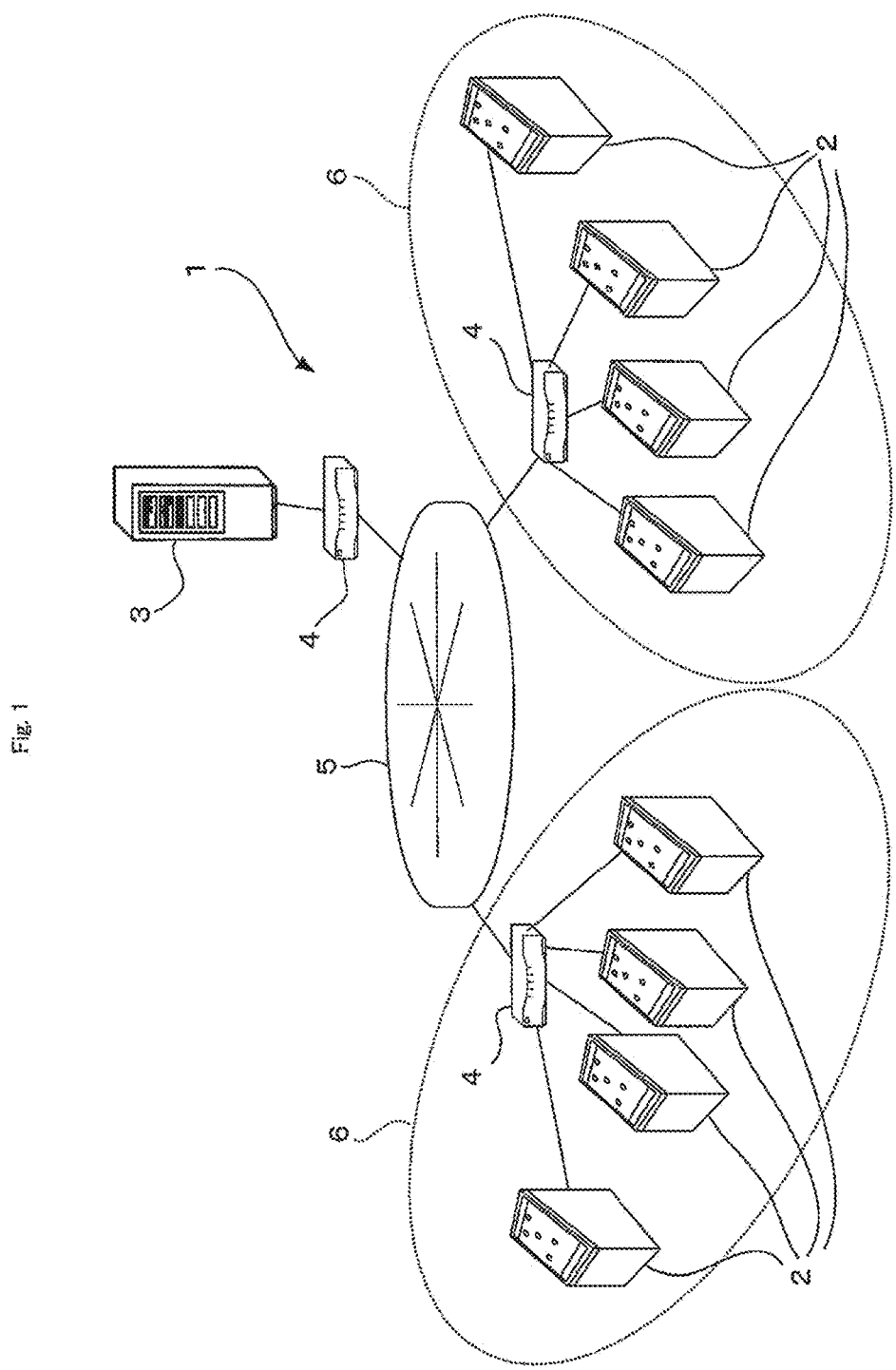
FIG. 1 is a diagram illustrating a game system to which a game machine according to an embodiment of the present invention is applied.

Hereinafter, an embodiment of a game machine according to the present invention will be described. FIG. 1 is a diagram illustrating a game system to which the game machine according to an embodiment of the present invention is applied. In the game system 1, a plurality of game machines 2 and a center server 3 are connected to a network 5 via routers 4. The center server 3 is not limited to this example configured by a single physical apparatus. For example, the single logical center server 3 may be configured by a server group that consists of a plurality of physical apparatuses. Each game machine 2 functions as a terminal apparatuses (or client) of the game system 1, by being connected to the network 5. As the network 5, the internet is used. Incidentally, the network 5 is not limited to the internet, as far as a communication line is used. Also, as the communication line, either wired line or wireless line may be used.

Each game machine 2 is configured as an arcade game machine which allows a play of a game in predetermined range in exchange for payment of play fee. An appropriate number of these game machines 2 are installed in each of several commercial facilities such as stores 6 or the like. Each router 4 is associated with and installed in each store 6 and the center server 3. The game machines 2 in the same store 4 are connected to the network 5 via the common router 4. Incidentally, a local server may be installed between the game machines 2 and each store 4. And, the game machines 2 may be connected to the center server 3 via the local server, so as to be able to communicate to the center server 3.

A control unit (not illustrated) is provided in the center server 3. The control unit is configured as a computer unit comprising a microprocessor and an internal storage (not illustrated) including: a read only memory (ROM) storing a program such as operating system or the like which should be executed by the microprocessor; a random access memory (RAM) providing a work area for the microprocessor, or the like. Further, an external storage (not illustrated) is connected to the center server 3. In the external storage, there are stored various server program to be executed by the control unit, and various data referred to by the server program.

Figure 2:
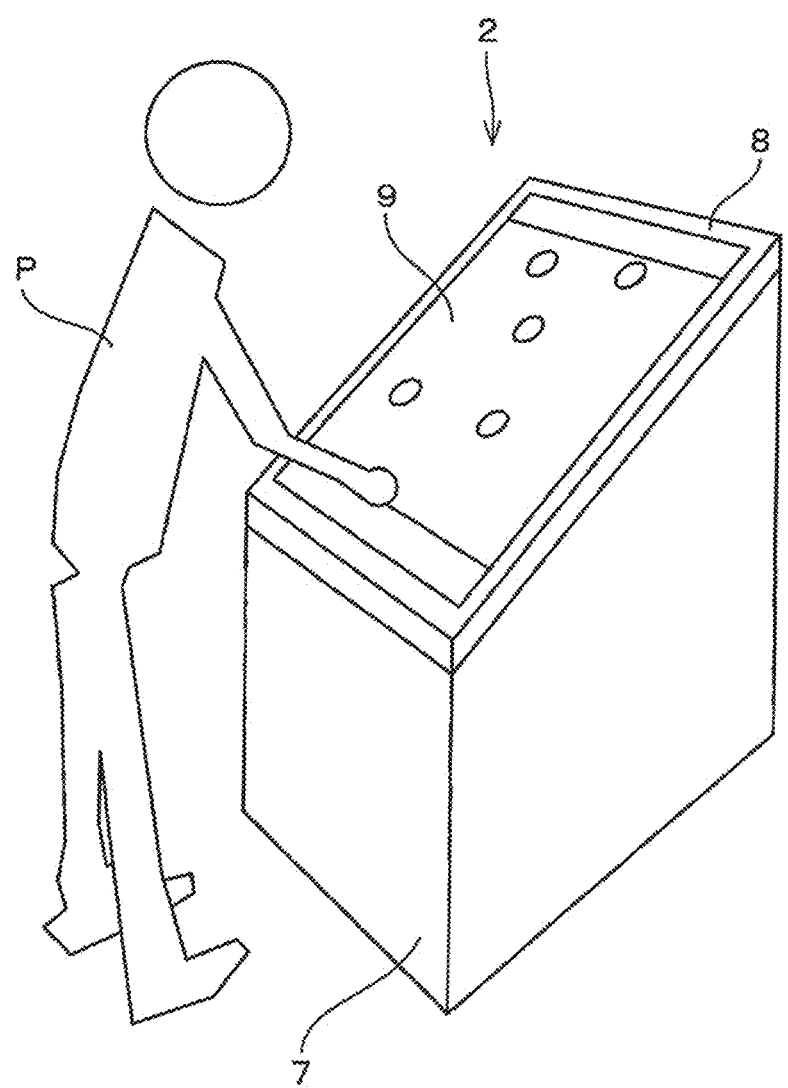
FIG. 2 is a diagram illustrating physical configuration of a game machine.

FIG. 2 is a diagram illustrating physical configuration of the game machine 2. The game machine 2 includes a casing 7, and a monitor 8 serving as a display apparatus arranged, obliquely toward a player P side, on the top surface of the casing 7. A transparent touch panel 9 is superimposed on the surface of the monitor 8. The touch panel 9 is a known input apparatus that outputs a signal corresponding to a contact position when the player P contacts the touch panel 9 with his/her finger or the like. In addition to the above apparatuses, the game machine 1 includes various kinds of input apparatuses and output apparatuses provided in a typical arcade game machine such as a button used to make a selection or a decision, a power switch, a volume operation switch, and a power lamp. However, they are not illustrated in FIG. 2.

Figure 3:
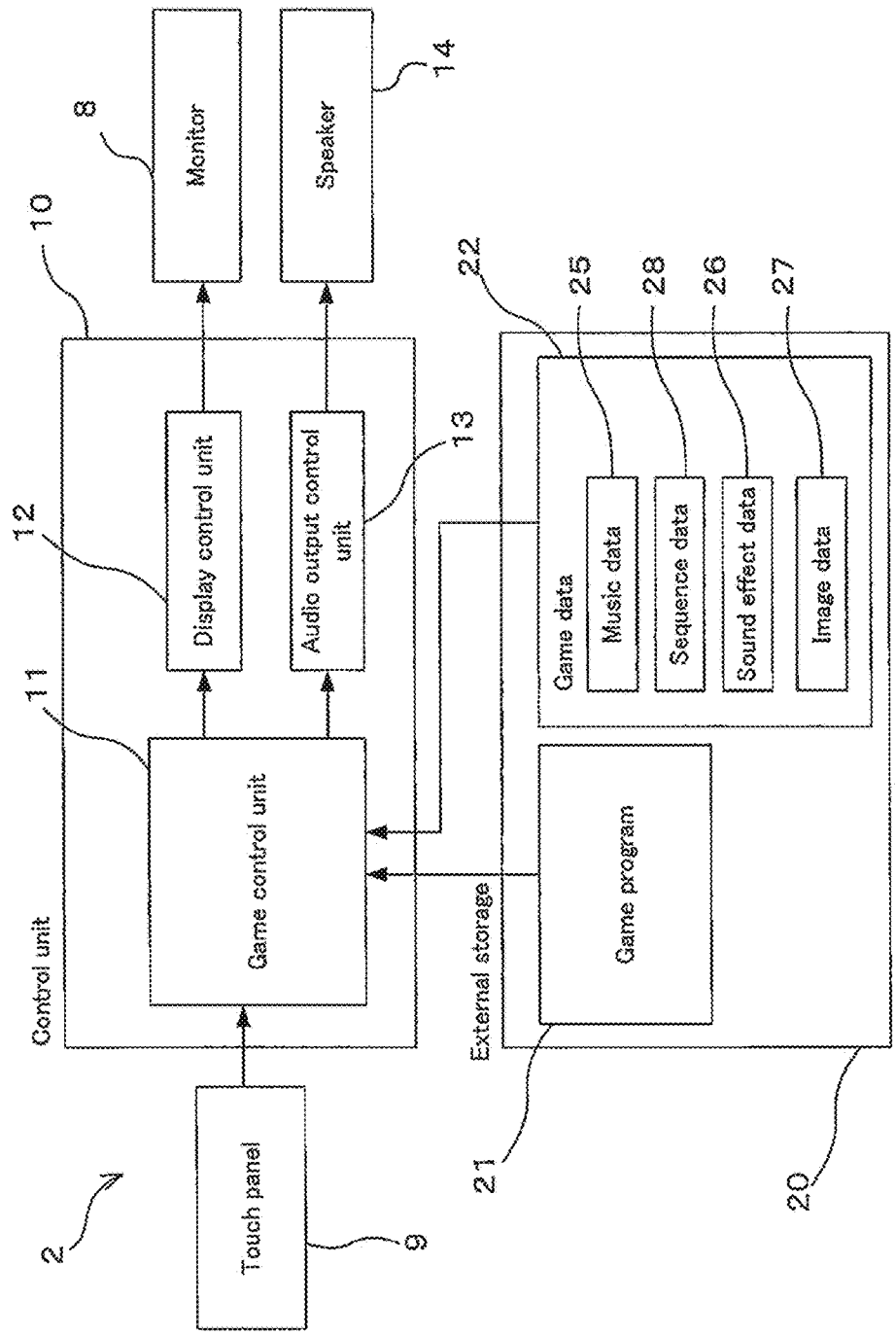
FIG. 3 is a functional block diagram of a game machine.

FIG. 3 is a functional block diagram of the game machine 2. As illustrated in FIG. 3, a control unit 10 serving as a computer is provided in the casing 7. The control unit 10 includes a game control unit 11 serving as a control host, a display control unit 12 and an audio output control unit 13 which operate according to an output from the game control unit 11. The game control unit 11 is configured as a unit in which a microprocessor is combined with various kinds of peripheral apparatuses such as an internal storage (for example, a ROM or a RAM) necessary for operations of the microprocessor. The display control unit 12 causes a predetermined image to be displayed on the monitor 8 by rendering an image corresponding to image data provided from the game control unit 11 in a frame buffer and then outputting a video signal corresponding to the rendered image to the monitor 8. The audio output control unit 13 causes a predetermined sound (including music or the like) to be reproduced from a speaker 14 by generating an audio reproduction signal corresponding to audio reproduction data provided from the game control unit 11 and then outputting the generated audio reproduction signal to the speaker 14 serving as an audio output apparatus connected to the control unit 10.

The game control unit 11 is connected with an external storage 20. As the external storage 20, there is used a storage medium in which data remains stored even when power is not supplied, such as an optical storage medium including a digital versatile disc-read only memory (DVD-ROM) and a compact disc-read only memory (CD-ROM) or the like, or a non-volatile semiconductor memory apparatus including an electrically erasable programmable read-only memory (EEPROM) or the like.

A game program 21 and game data 22 are stored in the external storage 20. The game program 21 is a computer program necessary for the game machine 2 to execute a music game according to a predetermined procedure. When the game machine 1 is activated, the game control unit 11 executes various kinds of initial settings necessary to operate as the game machine 2 by executing an operation program stored in an internal storage thereof. And then, the game control unit 11 sets an environment for executing the music game according to the game program 21 by reading the game program 21 and then executing the game program 21 from the external storage 20. The game control unit 11 is a logical apparatus actualized by a combination of computer hardware and a computer program. The game control unit 11 executes processes necessary for the music game such as a process of instructing the player to make an operation in tune with reproduction of music (musical composition) selected by the player, and a process of generating a sound effect in response to the player's operation. Furthermore, as a part of the processes, the game control unit 11 executes also a process of evaluating the player's operation and then controlling a game based on an evaluation result, or the like.

The game data 22 includes various pieces of data to be referred to when the music game is executed according to the game program 21. As examples of such various pieces of data, the game data 22 includes music data 25, sound effect data 26, and the image data 27. The music data 25 is data necessary to cause music which is a target of the game to be reproduced and output from the speaker 14. FIG. 3 illustrates a single kind of music data 25, but the player can actually select the music to be played from among a plurality of pieces of music. These pieces of the music data 25 are recorded with information for identifying each piece of music, in the game data 22. The external storage 20 functions as a music data storage device, by storing the music data 25.

The sound effect data 26 is data in which each of one or more types of sound effects to be output from the speaker 14 in response to the player's operation is recorded in association with a unique code for each of the sound effects. The sound effect includes sounds of musical instruments and various kinds of sounds. Pieces of sound effect data which are equal in number to a predetermined octave number and have different musical pitches according to each of kinds of sounds may be prepared. The image data 27 is data used to cause a background image, various kinds of objects or icons, and the like in a game screen to be displayed on the monitor 8.

The game data 22 further includes sequence data 28 serving as reference timing data. The sequence data 28 is data used to define operations to be indicated to the player. At least a piece of the sequence data 28 is prepared for a single music data. The details of the sequence data 28 will be described later. The external storage 20 functions as a reference timing data storage device, by storing the sequence data 28.

Next, an outline of the music game executed by the game machines 2 will be described. The game machines 2 are configured as music game machines of a match-up type which competes for a result by operation timings of two players (including a case in which the game machine 2 functions as the other player) when the two players execute an operation in tune with music. Further, through such a music game, the game machines 2 are configured so that one game player of one game machine itself can play with the other players of the other game machines 2 connected to the one game machine via the network 5.

Before the game is started, there is sent matching request requiring an opponent, from each game machine 2 to the center server 3 via the network 5. The center server 3 makes a match between two players playing with each other, based on the matching request from each game machine 2. When the opponent is determined based on designation of the center server 3, between the players, there is started the play using communication between the game machines 2.

Figure 4:
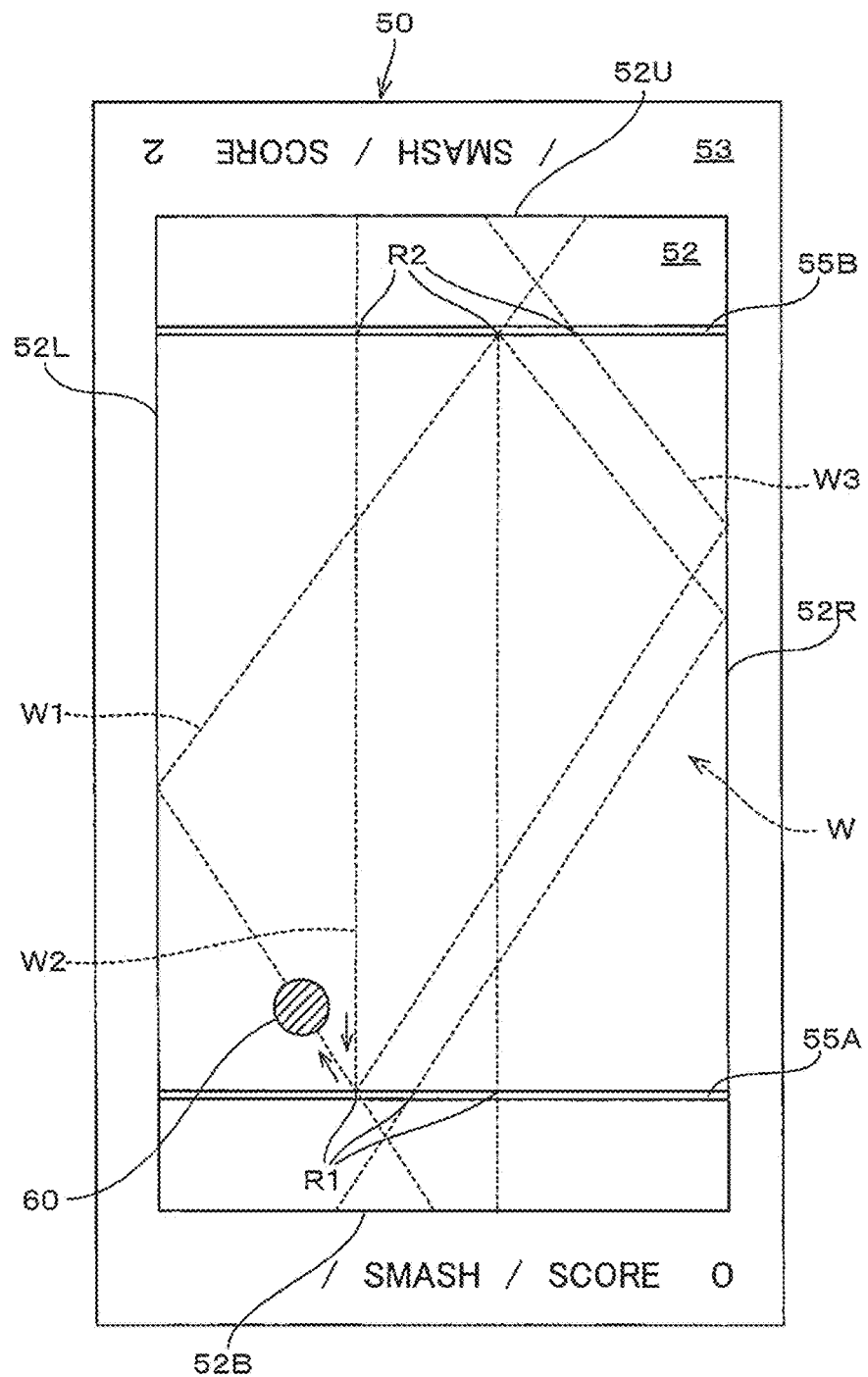
FIG. 4 is a diagram schematically illustrating a game screen of a music game which is played through game machines.

FIG. 4 is a diagram schematically illustrating a game screen of the music game which is played through the game machines 2. The game screen 50 includes a game region 52 for teaching operation timings to the player, and an information region 53 for displaying game information including scores of two players in which a match has been made, or the like. The game region 52 is formed as a quadrilateral. A first reference portion 55A and a second reference portion 55B serving as reference portions are arranged on near both ends of the game region 52 in a longitudinal direction (the vertical direction of the FIG. 4) so as to face each other. Each of the reference portions 55A and 55B extends in the form of a straight line in a direction orthogonal to the longitudinal direction of the game region 52.

Each of the reference portions 55A and 55B is used as a reference of a current time on the game by the both players of two game machines 2 in which a match has been made. Specifically, the first reference portion 55A functions as a mark indicating a reference of a current time of the player of the one game machine (who may be hereinafter referred to as the first player). And, the second reference portion 55B functions as a mark indicating a reference of a current time of the player of the other machine who becomes the opponent (who may be hereinafter referred to as second player). Here, in the example of FIG. 4, the game screen 50 is illustrated so that the near side is at the bottom and the far side is at the top in view of the player side. Further, at each of the reference portions 55A and 55B, different colors are used for distinguishing each player. In the example of FIG. 4, a red straight line is used as the first reference portion 55A, and a blue straight line is used as the second reference portion 55B. Further, the information region 53 is arranged around the game region 52. One end side of the game region 52 in the longitudinal direction is used for displaying a score and the like of the one player. And, the other end side thereof is used for displaying a score and the like of the other player.

Each of the reference portions 55A and 55B includes a plurality of rebounding points arranged at predetermined intervals. As illustrated in the diagram as broken lines, the plurality of rebounding points R1 included in the first reference portion 55A and the plurality of rebounding points R2 included in the second reference portion 55B are connected with each other through a plurality of paths W. Specifically, on the first reference portion 55A, there are provided the plurality of paths W reaching from one rebounding point R1 to the rebounding points R2 included in the second reference portion 55B. In the same way, on the second reference portion 55B, there are provided the plurality of paths W reaching from one rebounding point R2 to the rebounding points R1 included in the first reference portion 55A. Incidentally, in the FIG. 4, there are illustrated only a part of rebounding points R1 and R2. However, many rebounding points R1 and R2 exist actually at predetermined intervals along reference portions 55A and 55B.

The plurality of paths W extending from the rebounding point R1 of the first reference portion 55A extends to upper side end portion 52U at the side of the second reference portion 55B while passing through the rebounding point R2. Further, the plurality of paths W extending from the rebounding point R2 of the second reference portion 55B extends to underside end portion 52B at the side of the first reference portion 55A while passing through the rebounding point R1. When one rebounding point R1 of the first reference portion 55A is focused on, for the one rebounding point R1, as the plurality of paths W, there are provided three paths W1, W2, and W3 extending from the one rebounding point R1 toward three rebounding point R2 included in the second reference portion 55B. During execution of the music game, that is, during the progress of reproduction of music, objects 60 serving as operation indication marks indicating operations are displayed on the paths W connecting the rebounding points R1 with the rebounding points R2 according to the sequence data 28. Incidentally, in FIG. 4, for convenience of description, the paths W1, W2, and W3 are denoted by the dashed lines. However, none of the plurality of paths W is displayed on the actual game screen 50.

The objects 60 appear at the rebounding points R1 or the rebounding points R2 at appropriate timings in music. Further, according to the progress of the music, the objects 60 move along the paths W extending from the rebounding points R1 or R2 at the appearance positions, toward the other of the rebounding points R1 and R2 positioned at the opposite side from one of the rebounding points R1 and R2 at the appearance positions. And, when appropriate operations are executed in tune with the arrival of the objects 60, the objects 60 disappear. In exchange for this disappearance of the objects 60, next objects 60 appear at the rebounding points R1 and R2 on each reference portion 55A or 55B at which the appropriate operations have been executed. That is, when the appropriate operations have been executed, arrival positions (the rebounding points) of the objects 60 function as the appearance positions of the next objects 60. Incidentally, each of objects 60 moves along any one of the paths W which is set at each rebounding point R1 (or R2). Steps for selecting one path W from the paths W are further described later.

The objects 60 which have appeared at the appearance positions move from the appearance positions toward the rebounding points R1 or R2 located in the other side. For this reason, when the appropriate operations have been executed, the objects 60 repeatedly move between the reference portions 55A and 55B so as to alternately rebound at the rebounding points R1 and R2. On the other hand, when the appropriate operations have not been executed, the objects 60 pass through each reference portion 55A or 55B, and move to the upper side end portion 52U or the underside end portion 52B along paths W. And, the arrival positions of the objects 60 at the upper side end portion 52U or the underside end portion 52B function as the appearance positions of the next objects 60. For this reason, when the appropriate operations have not been executed, the objects 60 change moving directions at each end portion 52U or 52B toward each reference portion located in the other side so as to alternately rebound at each end portion 52U or 52B. As the moving paths of the objects 60 after rebounding at the end portions 52U and 52B, there are set paths in which the distance to the rebounding points to be arrived at will become shortest without going through side walls 52L and 52R.

As the appropriate operations described above, each player is required to perform a touch operation of touching the position of the reference portion 55A or 55B at which the objects 60 have arrived in tune with the arrival of the objects 60 at the reference portion 55A or 55B. When each player performs the touch operation, there is detected a time difference between a time when the objects 60 match each of the reference portions 55A and 55B and a time when each player has performed the touch operation. The smaller the time difference is, the higher an operation of the player is evaluated. Further, a sound effect is reproduced from the speaker 14 in response to the touch operation. A well-known method may be used as the method of reproducing the sound effect. For example, as the well-known method of reproducing a sound effect, there exist a method of adding a sound effect from music while reproducing the music, and a method of reproducing a sound effect corresponding to a miss operation while muting the music when missed. Further, for example, there also exists a method in which when music is divided in parts, each part is assigned to each operation timing, and the appropriate operations are executed, a part of the music assigned to the corresponding operation timing is played back (a method of forming the music by the appropriate operation at each operation timing. For this reason, when a miss operation is made, a part of the music to which the operation timing is assigned is not reproduced).

In the example of FIG. 4, the object 60 moves toward the rebounding point R2 of the second reference portion 55B along the path W1. In this case, it is preferable that the second player performs the touch operation at the position of the second reference portion 55B displayed on the other game machine (the second player's own game machine) at which the object 60 arrives, in tune with the arrival at the second reference portion 55B. Further, the object 60 is displayed in color corresponding to the reference portion 55A or 55B of a destination toward which the object 60 is currently moving. In other words, in the example of FIG. 4, the object 60 is displayed in blue until arriving at the rebounding point R2 of the second reference portion 55B, and the next object 60 appearing at the rebounding point R2 at the arrival position is displayed in red. In this embodiment, a plurality of operating units are configured by a combination of each of the reference portions 55A and 55B on the monitor 8 and the touch panel 9 superimposed thereon. Incidentally, in the following, each of the reference portions 55A and 55B may be used as a term representing the operating unit. Further, the second reference portion 55B is the reference portion corresponding to the operating unit of the opponent player's game machine (the other machine).

Figure 5:
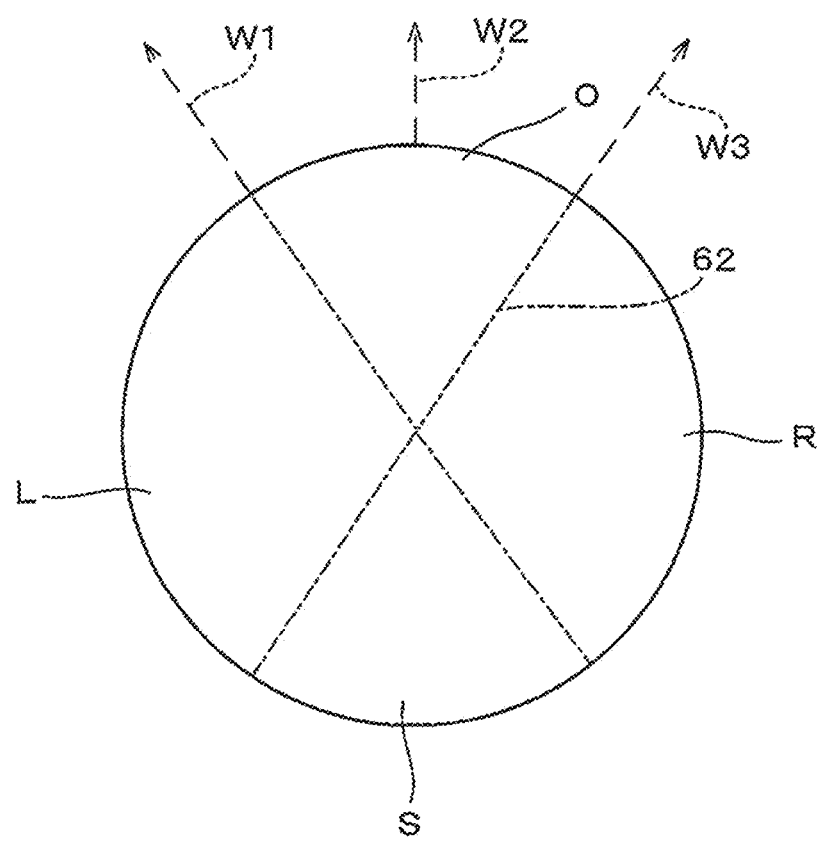
FIG. 5 is a diagram for describing a region of an object.

The paths W along which the objects 60 move are determined based on positions of the objects 60 when the reference portion 55A or 55B is touched. In order to make a comparison of position easy, each object 60 is divided into a plurality of regions. FIG. 5 is a diagram for describing regions of each object 60. In FIG. 5, dashed lines represent the paths W1, W2, and W3. And, an alternate long and short dash line 62 represents the boundary between the regions.

In the example of FIG. 5, the object 60 is divided into four regions. In the four regions, there are included a contact region S, right region R, left region L, and remaining region O. The contact region S is a region near a contact point at which the object 60 first comes in contact with each reference portion 55A or 55B. The right and left regions R and L are regions located at the right and left side of the contact region S. And, according to the touch operation of the player to any one of regions, there is selected the path W along which the object 60 should move next. Specifically, as the path along which the object 60 moves, when near the contact region S or the remaining region O (including each region) are touched, the straight line path W2 reaching to R1 at the shortest distance is selected. Further, the first right path W3 reaching to R1 through the right side wall 52R of the game region 52 in the longitudinal direction is selected, when near the left region L (including this region) is touched. And, the first left path W1 reaching to R1 through the left side wall 52L of the game region 52 in the longitudinal direction is selected, when near the right region R (including this region) is touched. The distances of moving paths W1 to W3 are different from each other. Therefore, the moving distance along which the object 60 moves to the reference portion 55A or 55B of the next destination differs, according to the positional relation between the operation position and the position of the object 60. Meanwhile, the operation timing to touch the object 60, that is, the timing at which the object 60 arrives at each of the reference portions 55A and 55B is constant regardless of the moving path. For this reason, the path and moving velocity of the object 60 which moves toward the one player change according to the touch operation of the other player. Since a difficulty level of the game is changed due to this, and the operation in which influence on the other player is considered is required to each player.

Incidentally, in FIG. 4, there is displayed only one object 60 in the game region 52. However, a plurality of objects 60 in which positions, velocities, or paths are different from each other may be displayed in the game region 52. In such a case, control about displays or movements of the objects 60 such as the appearance positions, the moving paths, or the disappearance positions of the objects 60 is executed for each object 60 according to the examples described above.

Further, pieces of music with different difficulty levels are provided in the game machines 2, as the music used in the music game. Furthermore, pieces of same music in which difficulty levels are different from each other are also provided. And, it is also possible to execute the play using the pieces of music with the different difficulty levels, between the one game machine 2 and the opponent game machine 2. In the case of the play using same music having same difficulty levels, a same game screen 50 (including a case in which the upper side and the downside are reversed) is displayed at same time on the game screens 50 of the one game machine and the opponent other game machine. However, when the difficulty levels are different, number of the objects 60 to be displayed in the same time may be different. Therefore, in the case of the play using the music with different difficulty levels, the game screens 50 in which number of the objects 60 or the like are different from each other may be used at the same time.

Figure 6:
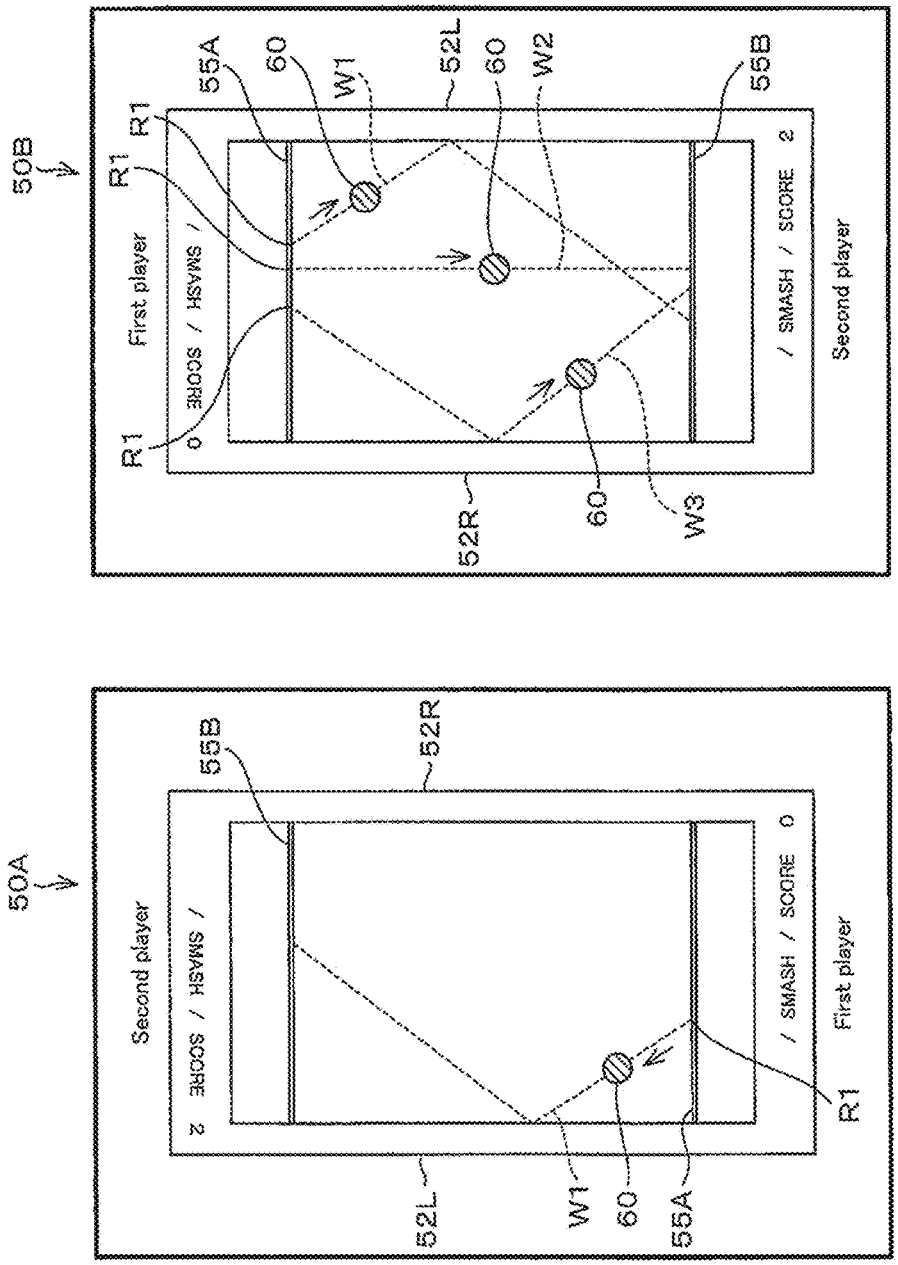
FIG. 6 is a diagram illustrating an example of each game screen displayed on each game machine during a play using a same music in which difficulty levels are different from each other.

FIG. 6 is a diagram illustrating an example of each game screen 50 displayed on each game machine 2 during the play using the same music in which the difficulty levels are different from each other. In FIG. 6, the one game screen 50A of the one game machine is located on the left side. In contrast, the other game screen 50B of the other game machine of the one game machine's opponent is located on the right side. Further, FIG. 6 illustrates the one game screen 50A and the other game screen 50B under the play at the same time. As illustrated in FIG. 6, in the one game screen 50A, there is displayed one object 60 moving toward the second reference portion 55B on the first left path W1 from the first reference portion 55A.

On the other hand, each reference portion 55A or 55B are located in the opponent game machine 2 on the position in which the upper side and the downside are reversed so that it is easy to play for the second player. Specifically, the first reference portion 55A used by the first player is located on the upper side in the other game screen 50B, in the opposite from the one game screen 50A. Also, the second reference portion 55B used by the second player is located on the downside in the other game screen 50B. Furthermore, in addition to the object 60 located on the first left path W1 extending from the rebounding point R1, other two objects 60 are displayed on the other game screen 50B. Specifically, as compared with the one game screen 50A, in the other game screen 50B, there are added displays of the object 60 moving on the first right path W3 and the object 60 moving on the straight line path W2. Further, the straight line path W2 and the first right path W3 extend from the rebounding point R1 different from the first left path W1 of the first reference portion 55A.

Normally, in the case of the play using the same music having same difficulty levels, a game screen in which the upper side and the downside of the one game screen 50A have been reversed (the first reference portion 55A is located on the upper side, the second reference portion 55B is located on the downside) should be displayed at the same time on the other game machine 2. However, as described in FIG. 6, in the case of the play using the music with the different difficulty levels, the different game screen 50 between the one game machine and the other game machine may be displayed. And, the one object 60 on the first left path W1 is seen by the first player. In contrast, a total of three objects 60 in which two objects 60 are added to the one object 60 are seen by the second player. Therefore, the appropriate operations for the three objects 60 are required to the second player playing through the other game machine 2.

Further, when the appropriate operations have been executed for the three objects 60 by the second player, three objects 60 corresponding to the three objects 60 and moving toward the first reference portion 55A may be further displayed on the other game screen 50B. However, three objects 60 corresponding to these three objects 60 are not always displayed on the one game screen 50A. In the one game screen 50A, for example, only one object 60 may be displayed as the object 60 corresponding to the three objects 60, according to the difficulty level of the music used by the one game machine 2. In other words, the play using the game screen 50 in which number of the objects 60 is different from each other may be executed, between the one game machine 2 and the other game machine 2.

As described above, when the play between the pieces of music with different difficulty levels is executed, used number of the objects 60 is different between both game machines 2. Therefore, it is not possible to use operation information of each player directly. In a case like this, one player's operation information is reflected on the other game screen 50, according to a predetermined reflection condition. Further, a predetermined ratio may be used as the predetermined reflection condition. As an example of the predetermined ratio like this, there is used a ratio of number of the objects 60 displayed. Referring to the example of FIG. 6, the predetermined ratio in this case is described below. In the example of FIG. 6, three objects 60 are displayed on the other game screen 50B, for one object 60 displayed on the one game screen 50A. That is, number of the objects 60 displayed is a ratio of 1 to 3. Accordingly, in this case, the ratio of 1 to 3 is applied as the predetermined ratio. Specifically, when the second player has missed the touch operation to the objects 60 three times through the other game machine, this is reflected on the game screen 50A as one time miss. That is, in the example of FIG. 6, when the second player has missed the operations (when the appropriate operations have not been executed) for all of the three objects 60 displayed on the other game screen 50B, the information of this miss operation is reflected as the operation for the one object 60 displayed on the one game screen 50A.

On the other hand, the operation results of the game machine 2 side in which number of the objects 60 displayed is less, that is, the operation results of the one game machine side in the example of FIG. 6 are reflected directly. In other words, in the example of FIG. 6, the miss operation for the one object 60 displayed on the one game screen 50A is reflected directly as the miss operation for one of the three objects 60 included in the other game screen 50B. In the way like this, one operation result is reflected to the other display. In this case, "1" or "3" constituting the ratio of 1 to 3 function as a predetermined number of the present invention. Further, the miss operation is employed as a specific kind of act of the present invention.

Incidentally, when the same music is used, common objects 60 corresponding to each other may be included. In contrast, when the different pieces of music are used, such common objects 60 may not be included. Therefore, the objects 60 to which the operation results on the other game machine are reflected are not limited to the objects 60 with the correspondence relation. Operation results on the other game machine may be reflected to the objects 60 without the correspondence relation, as far as it is reflected with the predetermined ratio. Further, the objects 60 to which the operation results are reflected is not limited to the objects 60 immediately after meeting the predetermined reflection condition. For example, the operation result (for example, the miss operation) for the object 60 meeting the predetermined reflection condition (for example, the object 60 for which the miss operation corresponding to predetermined number has been executed) may be reflected to the object 60 which is delayed in predetermined number from the object to which the operation result should be reflected. In other words, the relation between the object 60 meeting the predetermined reflection condition and the object 60 to which its result is reflected may be shifted at predetermined number.

Figure 7:
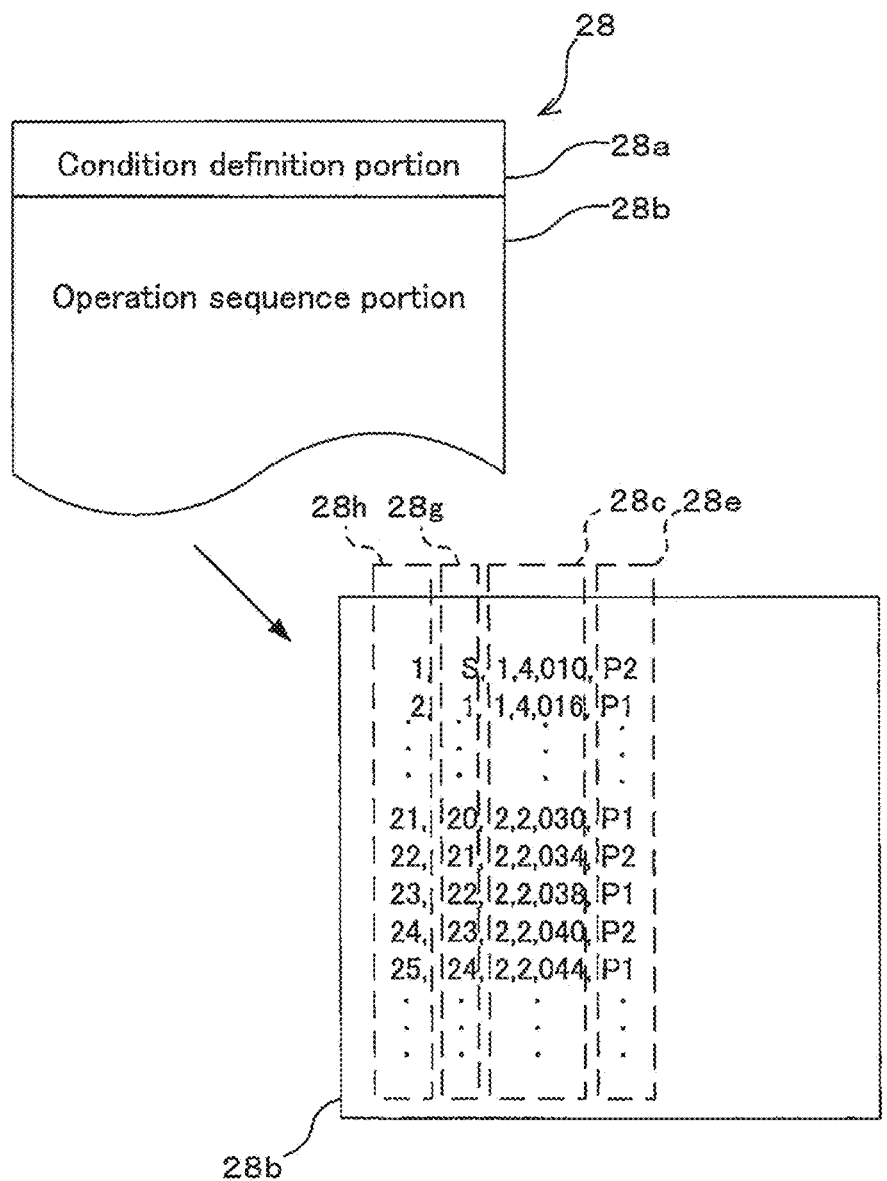
FIG. 7 is a diagram illustrating an example of contents of sequence data.

Next, the details of the sequence data 28 will be described with reference to FIG. 7 and FIG. 8. FIG. 7 is a diagram illustrating an example of contents of the sequence data. As illustrated in FIG. 7, the sequence data 28 includes a condition definition portion 28a and an operation sequence portion 28b. In the condition definition portion 28a, there is described information designating an execution condition of a game that differs according to the music such as information designating the tempo, a beat, a track of music, and a sound effect to be generated when the touch operation is performed on the objects 60. Incidentally, in FIG. 7, the condition definition portion 28a is included only in the head portion of the sequence data 28, but the condition definition portion 28a may be added to an appropriate intermediate position of the operation sequence portion 28b. Thus, processing of changing the tempo of the music, an assignment of a sound effect, or the like can be actualized.

Meanwhile, in the operation sequence portion 28b, each timing to touch each object 60, and information indicating each player (in other words, information indicating each reference portion at which the object 60 should arrive, among the reference portions 55A and 55B) are described in association with each other. Further, the operation sequence portion 28b also includes information for indicating the appearance position of each object 60.

As a part of details is illustrated in FIG. 7, in this example, the operation sequence portion 28b includes an operation timing portion 28c, a display position indication portion 28e, a record information portion 28h, and an appearance position indication portion 28g. The operation timing portion 28c indicates timings (operation timings) to perform operations in the music. The display position indication portion 28e indicates each player on which the objects 60 start to be displayed (in other words, any one of reference portions on which the objects 60 start to be displayed). The record information portion 28h is for distinguishing each record. The appearance position indication portion 28g indicates each appearance position of each object 60. In other words, the operation sequence portion 28b is configured as a set of a plurality of records in which these pieces of information are described so as to be associated with each other.

Each operation timing is described such that a bar number in the music, a beat number, and a value representing a time in a beat are separated by a comma. The time in a beat refers to an elapsed time from the head of one beat, and is represented by the number of units, from the head of the beat, obtained by equally dividing the length of one beat into n unit times. For example, when a time in which n is 100, and ¼ elapses from the head of the second beat in the second beat of the first bar of music is designated as an operation timing, "01,2,025" is described.

In the display position indication portion 28e, there are described indications for each player side on which the objects 60 should start to be displayed. Specifically, in a case indicating the first reference portion 55A side corresponding to the first player, there is described "P1". And, in a case indicating the second reference portion 55B side corresponding to the second player, there is described "P2". Each indication for each player on which each object 60 starts to be displayed corresponds to the indication for the reference portion requiring the touch operation, since the objects 60 move between the reference portions 55A and 55B. Specifically, when the first reference portion 55A is indicated as the position for starting the display, this corresponds to the indication for the touch operation on the second reference portion 55B, since the object 60 in which the display is started moves toward the second reference portion 55B at the opposite side. Similarly, when the second reference portion 55B is indicated as the position for starting the display, this corresponds to the indication for the touch operation on the first reference portion 55A located at the opposite side, that is, located at the moving direction of the object 60 in which the display is started. Furthermore, the indication of the player on which the object 60 starts to be displayed corresponds to an indication of the color of the object 60 to be displayed. And, a blue object 60 is displayed when the indication of the player is "P1". Also, a red object 60 is displayed when the indication of the player is "P2".

In the record information portion 28h, there are described numbers according to alignment sequence for each object 60. Specifically, as the record information, "1" is described in the initial record. And, after this, unique numbers such as "2", "3", or the like are described in each record in descending order from upper side.

In the appearance position indication portion 28g, there is described information indicating the record numbers. In other words, as the information indicating the appearance position, there are described numbers such as "1", "2", "3", or the like. When "1" is described in the appearance position indication portion 28g, as the appearance position, there is indicated the arrival position of the object indicated by the record of which "1" is described in the record information portion 28h. Specifically, as the appearance position of the object 60 corresponding to the record of which "1" is described in the appearance position indication portion 28g, there is indicated the position at which the object 60 corresponding to the number 1 of the record information portion 28h has been touched appropriately, or has arrived by the miss operation. Similarly, when "2" or "3" are described in the appearance position indication portion 28g, as the appearance positions, there is indicated the position at which the object 60 corresponding to the records of which "2" or "3" are described in the record information portion 28h has been touched appropriately, or has arrived by the miss operation.

Furthermore, the information described in the appearance position indication portion 28g also corresponds to an indication of the appearance timing. Specifically, the object 60 corresponding to the record of which "1" is described in the appearance position indication portion 28g starts to be displayed at a timing at which the object 60 corresponding to the record of which "1" is described in the record information portion 28h has been touched appropriately (or the timing in which this object 60 arrived at each end portion 52U or 52B). In other words, in order to make an effect of continuity, in the appearance position indication portion 28g, there is described the indication for associating one record with next record corresponding to the next object 60 so that the next object starts to be displayed on the arrival position (or the position on which the appropriate touch operation has been executed) of the object 60 corresponding to the one record at the arrival timing (or the timing at which the appropriate touch operation has been executed). Further, information indicating fixed position is described as the initial appearance position for the appearance position corresponding to the initial record. For example, as the information indicating such an initial appearance position, an alphabet such as "S" or the like is described in the appearance position indication portion 28g.

In the example of FIG. 7, it is indicated that the red object 60 arriving at the second reference portion 55B at a timing in which "010" elapses from the start point in time of the fourth beat of the first bar appears at the initial appearance position on the first reference portion 55A. Further, by the indication of this example, the arrival position and arrival timing (or, the position on which the appropriate touch operation has been executed and the timing thereof) of this object 60 function as the appearance position and the appearance timing of the blue object 60 arriving at the second reference portion at a timing in which "016" elapses from the start point in time of the fourth beat of the first bar.

On the other hand, FIG. 8 is a diagram illustrating an example of contents of the sequence data 28 corresponding to high difficulty level. The part illustrated in FIG. 8 corresponds to the part illustrated by the sequence data 28 of FIG. 7. In other words, in the part of FIG. 7 and the part of FIG. 8, there is illustrated the case in which the music is same but the difficulty level is different with each other (the difficulty level of FIG. 8 is higher than that of FIG. 7). When the part illustrated in FIG. 7 is compared with the part illustrated in FIG. 8, as illustrated in FIG. 8, in the sequence data 28 of FIG. 8, as the record information portion 28h, there are added two records in which numbers of "25" and "26" are described. Specifically, in the sequence data 28 of FIG. 8, there is added the indication displaying the object 60 arriving at the first reference portion 55A at the timing in which "041" elapses from the start point in time of the second beat of the second bar. Similarly, there is also added the indication displaying the object 60 arriving at the first reference portion 55A at the timing in which "042" elapses from the start point in time of the second beat of the second bar. In other words, the sequence data 28 of FIG. 8 includes more indications for the operation timings than that of FIG. 7 by these added records. Therefore, when the sequence data 28 of FIG. 8 is used, in comparison with the case in which the sequence data 28 of FIG. 7 is used, number of objects displayed becomes large by number of these records. In this way, the game data 22 includes not only the sequence data 28 corresponding to the pieces music with the different difficulty levels from each other but also sequence data 28 corresponding to the pieces of same music having the different difficulty levels.

Figure 9:
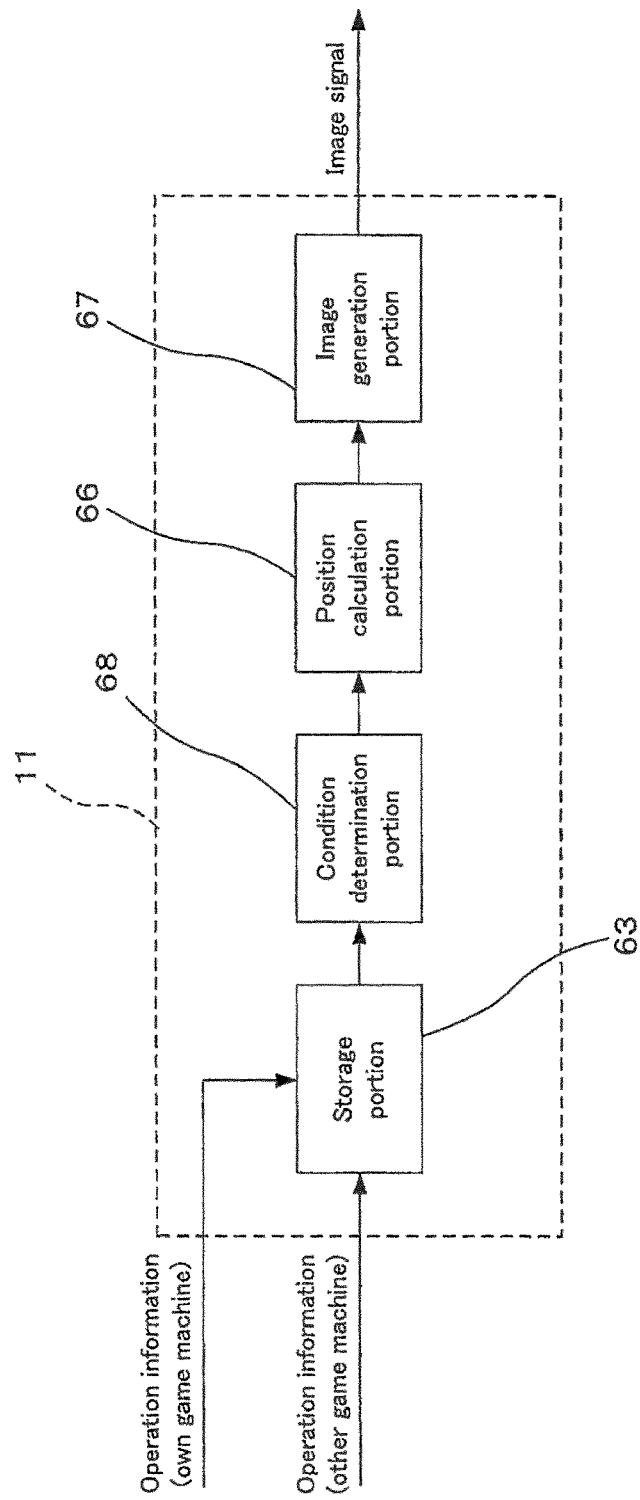
FIG. 9 is a functional block diagram of a game control unit 11 for actualizing a play using pieces of music with different difficulty levels.

Next, a configuration for actualizing the play using the pieces of music with the different difficulty levels will be described with reference to FIG. 9. FIG. 9 is a functional block diagram of the game control unit 11 for actualizing the play using the pieces of music with the different difficulty levels. As illustrated in FIG. 9, the game control unit 11 is provided with a storage portion 63, a position calculation portion 66, an image generation portion 67, and a condition determination portion 68. The operation information of the one game machine (own game machine) and the opponent game machine (the other game machine) is stored in the storage portion 63. And, the condition determination portion 68 determines the paths W on which the objects 60 to be displayed on the one game screen 50A should be arranged, based on the operation information stored in the storage portion 63. At this time, the condition determination portion 68 also determines whether or not the predetermined reflection condition in which the operation information in one of game machines 2 should be reflected to the game screen 50 of the other game machine 2 is met. This determination result is provided to the position calculation portion 66.

The position calculation portion 66 calculates each position (coordinate) on the game screen 50 on which each object 60 should be arranged, based on the determination of the condition determination portion 68. The calculation result is provided to the image generation portion 67. And, based on the calculation result of the position calculation portion 66, the image generation portion 67 generates and outputs image data so that the game screen 50 on which the objects 60 are arranged at the calculated positions is displayed. Due to this, the game screen 50 differing from one of game machines (for example, the other game machine) is displayed on the other monitor 8 (for example, the monitor 8 of the one game machine) so that one operation information (for example, the operation information of the other game machine) is reflected to the other (for example, the one game machine) according to the predetermined reflection condition.

Next, processes executed by the game control unit 11 for actualizing the play using the pieces of music with the different difficulty levels between both game machines 2 through the network 5 will be described. The game control unit 11, in order to actualize such a play, executes an operation detection process routine of FIG. 10, a sequence process routine of FIG. 11, and subroutines of FIG. 12 and FIG. 13. Incidentally, in addition to the above processes, the game control unit 11 executes various kinds of well known processes necessary for executing the music game such as a matching process, a process for evaluating operations of the players, or the like. However, details of these processes are not described.

Figure 10:
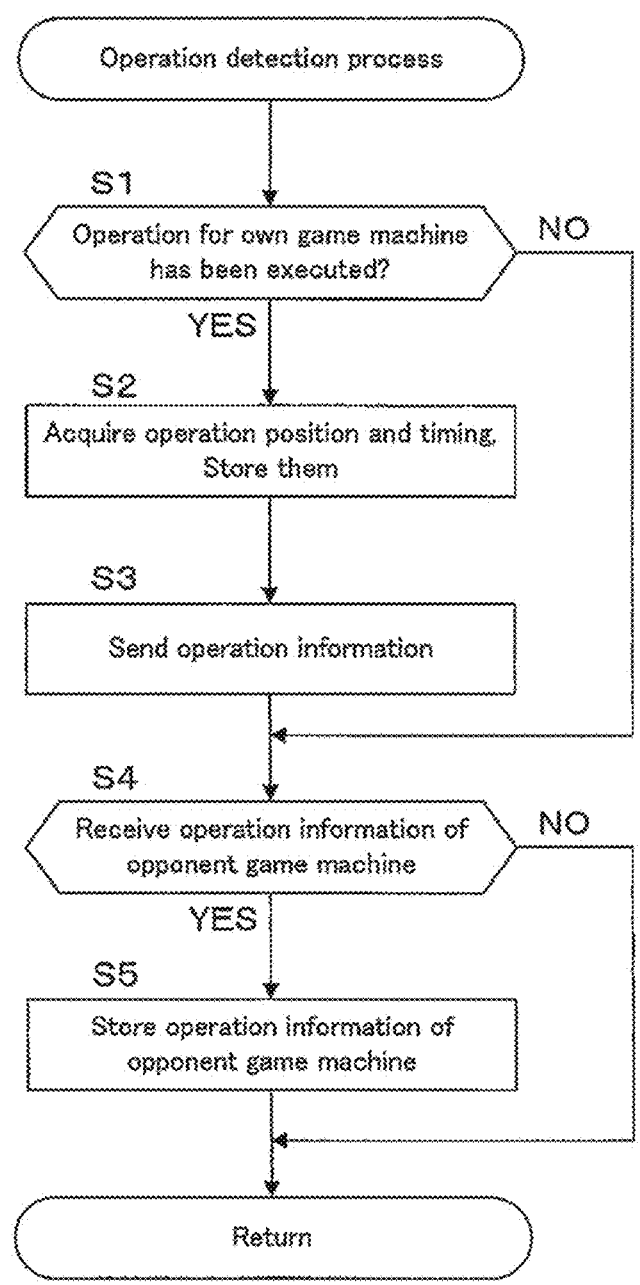
FIG. 10 is a diagram illustrating an example of a flowchart of an operation detection process routine.

FIG. 10 is a diagram illustrating an example of a flowchart of the operation detection process routine executed by the game control unit 11. The game control unit 11 executes the routine of FIG. 10 at predetermined cycle repeatedly. The routine of FIG. 10 is a process executed for obtaining contents (the operation position and the operation timing) of the touch operation by the first player and the second player.

When the routine of FIG. 10 is started, in Step S1, the game control unit 11 first determines whether or not the touch operation has been executed by the first player after the last routine is finished, with reference to outputs of the touch panel 9. When the touch operation has been executed, the game control unit 11 proceeds to Step S2. In Step 2, the game control unit 11 acquires the position in which the touch operation is executed by the first player, and the timing at which the touch operation is executed. And, the game control unit 11 also generates the operation information including them, and causes the storage portion 63 to store this operation information. In next Step 3, the game control unit 11 sends the operation information stored in Step 2, to the opponent game machine 2.

In next Step S4, the game control unit 11 determines whether or not the operation information has been received from the opponent game machine 2 after the finish of the last routine. When the operation information has been received, the game control unit 11 proceeds to Step S5. And, the game control unit 11 causes the storage portion 63 to store the received operation information with the receipt time in this Step S5. After the finish of the processing in Step S5, the game control unit 11 finishes the current process. On the other hand, when the determination result in Step S1 is negative result, that is, when the touch operation has not been executed, the game control unit 11 skips Step S2 and Step S3, and proceeds to Step S4. Furthermore, when the determination result in Step S4 is negative result, that is, when the operation information has not been received, the game control unit 11 skips Step S5, and finishes the current routine. As the actual operation timing of each player, there is handled each of operation timings of the first player and the second player included in the operation information stored by the routine of FIG. 10.

Figure 11:
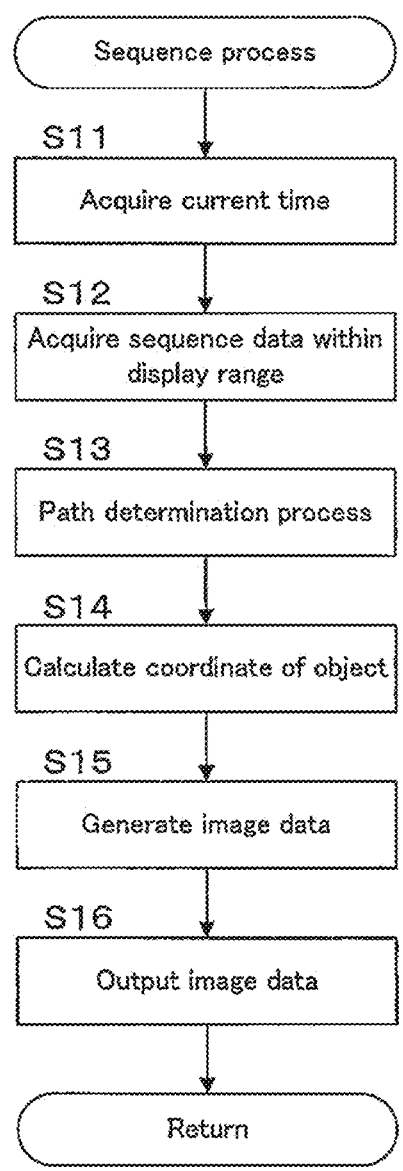
FIG. 11 is a diagram illustrating an example of a flowchart of a sequence process routine.

On the other hand, FIG. 11 is a diagram illustrating an example of a flowchart of the sequence process routine executed by the game control unit 11. The routine of FIG. 11 is a process executed for displaying and moving the objects 60 in the game region 52. The game control unit 11 executes the routine of FIG. 11 at predetermined cycle repeatedly. The cycle is equal to the rendering cycle of the game screen 50, that is, the frame rate. Incidentally, the cycle in which the routine of FIG. 11 is executed is equal to the cycle in which the routine of FIG. 10 is executed, or longer than that.

When the routine of FIG. 11 is started, in step S11, the game control unit 11 first acquires a current time in the music. For example, clocking is started, by an internal clock of the game control unit 11, and the current time is acquired from a value of the internal clock, based on a reproduction start point time of the music. The time on the music may be specified based on elapsed time from the reproduction start point time. Further, it may be specified based on another value which is correlated with the elapsed time. For example, the time may be specified by using number of beats from the reproduction start point time of the music, number of frames of the game screen 50, or the like.

Next, in Step S12, the game control unit 11 acquires data of the operation timings which are present within a time length corresponding to a display range of the game region 52 which should be rendered at the next frame, from the sequence data 28. And, the game control unit 11 retains it in the internal storage. As an example, the display range is set to a time range of about two bars of the music from the current time (incidentally, the time at the rendering time of the next frame) to the future. In next Step S13, the game control unit 11 executes a subroutine for determining the paths at which all of the objects 60 to be rendered in next frame should be arranged. The details of this subroutine will be described later.

In next Step S14, the game control unit 11 calculates coordinates of the objects 60 to be rendered in next frame. As an example, this calculation is made as follows. First, the game control unit 11 determines each path W to display each object 60 included in the display range, based on the processing result of Step S13. Next, the game control unit 11 determines the position of each object 60 from the reference portions 55A and 55B in the time axis direction (that is, the moving direction of the objects 60), according to the moving direction (the reference portions 55A or 55B at which the objects 60 should arrive) corresponding to each the object 60, and a time difference between each operation timing and a current time. Through this operation, it is possible to acquire the coordinates of the objects 60 necessarily for arranging each object 60 on each path W along the time axis from each reference portion 55A or 55B.

In next Step S15, the game control unit 15 generates image data necessary for rendering the game region 52, based on the coordinates of the objects 60 calculated in Step S14. Specifically, the game control unit 11 generates the image data so that each object 60 is arranged on each calculated coordinate. Images of the objects 60 or the like may be acquired from the image data 27. In next step S16, the game control unit 11 outputs the image data to the display control unit 12. As a result, the display of the game region 52 on the monitor 8 is renewed. When the processing of Step S16 ends, the game control unit 11 finishes the current routine. By executing repeatedly the above-described processes, each object 60 appears at the predetermined position in game region 52. Further, each object 60 proceeds on each path W according to the operation of each player, in tune with the progress of the music. And, the display of each object 60 is controlled so that each object 60 arrives at each reference portion 55A or 55B at the predetermined operation timing.

Figure 12:
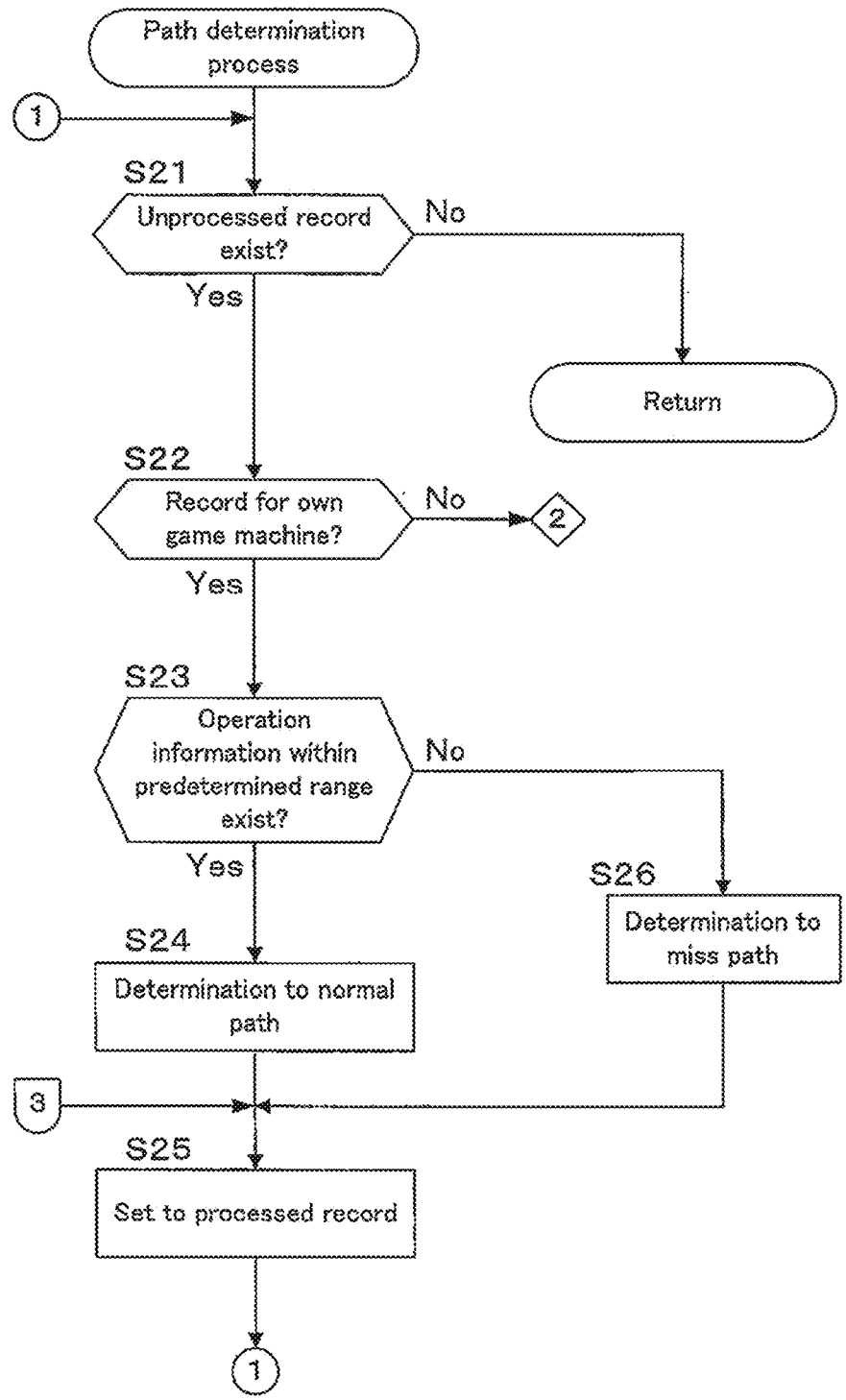
FIG. 12 is a diagram illustrating an example of a flowchart of a path determination process routine.
Figure 13:
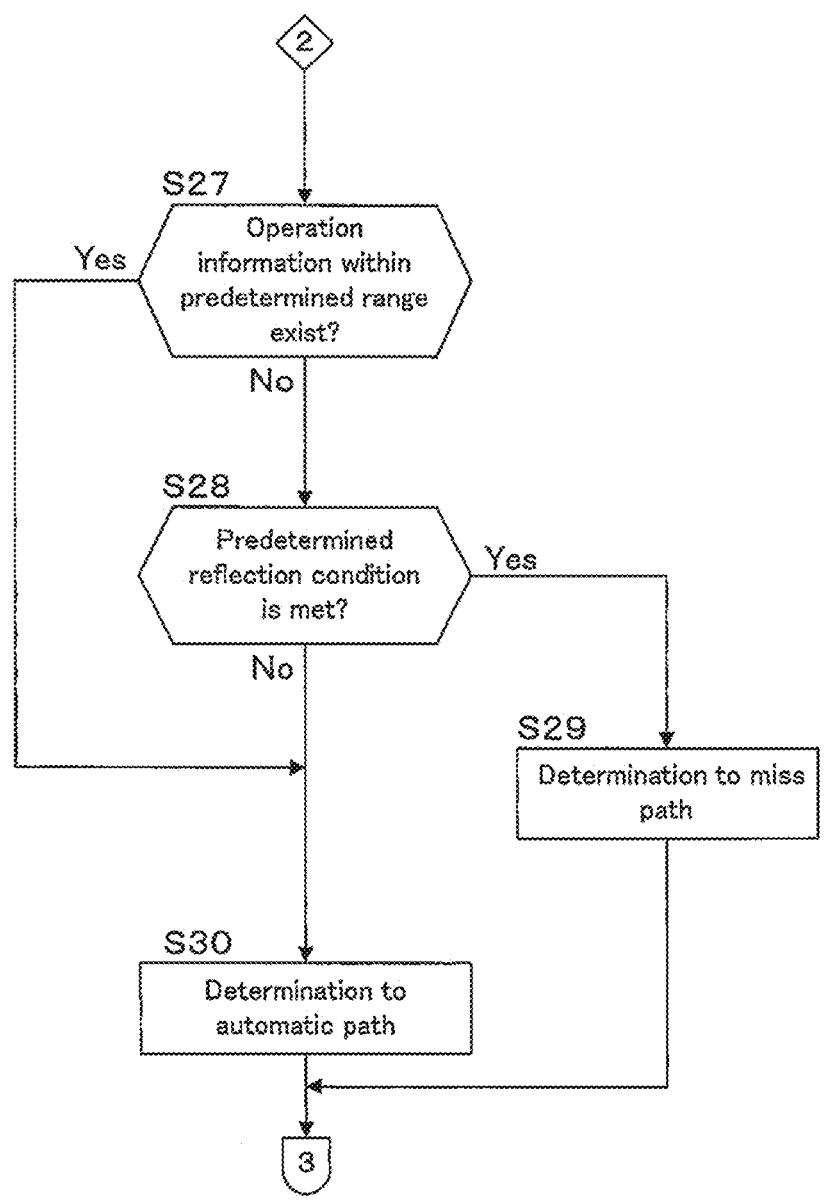
FIG. 13 is a diagram illustrating an example of a flowchart following FIG. 12.

Next, a path determination process routine will be described, in reference to FIG. 12 and FIG. 13. FIG. 12 and FIG. 13 are diagrams illustrating an example of a flowchart of the path determination process routine. This routine is called and executed in Step S13, as the subroutine of the routine of FIG. 11. The routine of FIG. 12 and FIG. 13 is a process for determining the path at which each object 60 should be arranged according to the operation result of each player. Further, the game control unit 11 executes this routine through the condition determination portion 68 mainly.

When the routine of FIG. 12 is started, in Step S21, the game control unit 11 first determines whether or not there are unprocessed records. The unprocessed record means each record of the sequence data 28 acquired in Step S12 of the routine of FIG. 11, that is, each record in which the processed record is not set among the operation timings. In other words, the unprocessed record means the operation timing in which the path W to arrange the object 60 is not determined yet among the operation timings included in the display range. When the result of Step S21 is negative result, that is, when the unprocessed record does not exist in the operation timings in display range, the game control unit 11 finishes the current routine. And, the game control unit 11 returns to the routine of FIG. 11.

On the other hand, when the result of Step S21 is of affirmative result, that is, when the unprocessed record exists, the game control unit 11 proceeds to Step S22. In Step S22, the game control unit 11 determines whether or not the unprocessed record of the processing target is of a record for the own game machine. This determination is executed, for example, based on the display position indication portion 28e included in the sequence data 28. Specifically, when the record of the processing target, that is, the display position indication portion 28e associated with the operation timing of the processing target is "P1", the game control unit 11 determines it as the record for the own game machine. In contrast, when the display position indication portion 28e of that is "P2", the game control unit 11 determines it as the record for the opponent game machine. When this determination result is of affirmative result, that is, when the record of the processing target is of the record for the own game machine, the game control unit 11 proceeds to Step S23.

In Step S23, the game control unit 11 determines whether or not there is the operation information including the operation timing of a record associated with the record of the processing target as the record indicating the appearance position within a predetermined range. As described above, in the sequence data 28, there are the operation timings associated with each other through the appearance position indication portion 28g. For example, among the records associated with these, the record indicating the appearance position is referred to as the indication record. In contrast, the record in which the appearance position is indicated is referred to as the subjected indication record. In Step S23, the game control unit 11 determines whether or not there is the operation information including the operation timing corresponding to the indication record of the processing target within the predetermined range. This reason is that the operation result to the object 60 corresponding to the indication record is reflected to the object 60 corresponding to the record of processing target. Further, this predetermined range is of the range of time which is set to the operation timing described in the sequence data 28 as an acceptable range in which it can be assumed that the appropriate operation has been performed. Furthermore, this predetermined range also is of the range of the distance which is set to the arrival position (the rebounding position of the moving target) of the object 60 to each reference portion 55A (or 55B) as an acceptable range in which it can be assumed that the object 60 is touched. When this determination result is affirmative, that is, when there is the operation information including the operation timing of the indication record within the predetermined range, the game control unit 11 proceeds to Step S24.

In Step S24, the game control unit 11 determines the path W at which the object 60 corresponding to the record of the processing target should be arranged, as the normal path. Specifically, the normal path is determined as follows, based on the operation information. The game control unit 11 first determines a positional relation between the position of the touch operation and the position of the object 60, based on the determined operation information. Further, the game control unit 11 determines the path W based on the positional relation. This determination is executed, as described above, based on any one of four regions O, R, S, and L illustrated in FIG. 5 in which the touch operation has been performed, or which is the nearest from the position of the touch operation. The relation between each region O, R, S, or L and the path is as described above. And, as the appearance position on the normal path, there is employed the appearance position indicated by the indication record described above. In other words, the normal path is determined, based on the touch operation included in the operation information and the appearance position indicated by the indication record.

In next Step S25, the game control unit 11 sets the record of the processing target to the processed record, and returns to the processing of Step S21. Due to this, the operation result of the own game machine is reflected to the object 60 corresponding to the operation result of the other game machine.

On the other hand, when the determination result of Step S23 is negative, that is, when there is not the operation information including the operation timing of the indication record within the predetermined range, the game control unit 11 proceeds to Step S26. In Step S26, the game control unit 11 determines the path W on which the object 60 corresponding to the record of the processing target is arranged, as the miss path. In the case in which there is not the operation information including the operation timing of the indication record within the predetermined range, this means that the appropriate operation is not performed to the object 60 corresponding to the indication record. In this case, the object 60 of the indication record corresponding to this record of the processing target arrives at any one of both end portions 52U and 52B. Therefore, for example, as the miss path of such a case, there is employed the path W extending toward the reference portion 55A (or 55B) at the opposite side in the shortest distance from the position on the end portion 52U (or 52B) at which the object 60 of the indication record arrives. Further, in this case, the position on the end portion 52U (or 52B) at which the object 60 of the indication record arrives is used as the appearance position of the object 60 corresponding to the record of the processing target. And, the game control unit 11 proceeds to Step S25, and executes the processing described above, after finishing the processing of Step S30.

Furthermore, when the determination result of Step S22 is negative result, that is, when the record of the processing target is of the record for the opponent game machine, the game control unit 11 proceeds to Step S27 of FIG. 13. In Step S27, the game control unit 11 determines whether or not there is the operation information including the operation timing of the indication record associated with the record of the processing target within the predetermined range, using the operation information stored in the storage portion 63. This determination is executed in the same way as Step S23 described above. When this determination result is negative, that is, when there is not the operation information including the operation timing of the indication record within the predetermined range, the game control unit 11 proceeds to Step S28.

In Step S28, the game control unit 11 determines whether or not the predetermined reflection condition is met. As the predetermined reflection condition, for example, there is employed a condition which is met in a case in which a specific kind of operation reaches at the predetermined ratio between the own game machine and the other game machine. Further, in Step S27, when there is not the operation information, the control unit 11 can determine this as the miss operation (the operation in which the position or the timing of the touch operation is not appropriate). In other words, the game control unit 11 determines whether or not it is the miss operation as the specific kind of act. Therefore, in Step S28, as an example of the specific kind of operation, there is applied the miss operation. Further, as the predetermined ratio, for example there is applied a ratio according to the difficulty level. As the ratio like this, for example, there is used the ratio of number of the operation timings. Specifically, when number of the operation timings is the ratio of 1 to 3, this ratio is applied as the predetermined ratio. In other words, in this case, if the difficulty level of the other game machine is higher than that of the own game machine, in Step S28, the game control unit 11 determines that the predetermined reflection condition has been met when the miss operation has been performed three times on the other game machine. Contrariwise, if the difficulty level of the own game machine is higher than that of the other game machine, in Step S28, the game control unit 11 determines that the predetermined reflection condition has been met when the miss operation has been performed one time on the other game machine. Incidentally, the predetermined ratio is not limited to the embodiment in which the predetermined ratio is set according to the difficulty level. For example, as the predetermined ratio, the fixed ratio may be set in advance.

When the determination result of Step S28 is affirmative result, that is, when the predetermined reflection condition is met, the game control unit 11 proceeds to Step S29. In Step S29, the game control unit 11 determines the path W on which the object 60 corresponding to the record of the processing target should be arranged, as the miss path. This determination is executed in same way as Step S26 described above. The game control unit 11 returns to Step S25 of FIG. 12, after finishing the processing of Step S29. And, the game control unit 11 executes the processing described above in Step S25.

On the other hand, when the determination result of Step S27 is affirmative result, or when the determination result of Step S28 is negative result, in other words, when there is the operation information including the operation timing of the indication record within the predetermined range, or when the predetermined reflection condition is not met, the game control unit 11 proceeds to Step S30.

In Step S30, the game control unit 11 determines the path W on which the object 60 corresponding to the record of the processing target should be arranged, as the automatic path. In this case, for example, as the appearance position, there is used the rebounding point R2 at which the object 60 corresponding to the record of the processing target arrives. Further, as the automatic path, there is used each path W extending from the rebounding point R2. And, any one of paths W may be determined by lottery. In other words, in this case, in Step S30, as the automatic path, there is used the path W which is determined by lottery from the paths W extending from the rebounding point R2 at which the object 60 corresponding to the indication record arrives. Further, in this case, the object 60 corresponding to the indication record disappears on the second reference portion 55B on which the rebounding point R2 is provided. Incidentally, the automatic path may be fixed for each rebounding point R2 in advance. Or, the automatic path may be changed in predetermined order. Furthermore, the automatic path may be determined by lottery from the paths W, according to the operation information on the other game machine, for example, based on each path W which can be determined in the case in which the operation information is used. And, as the automatic path, the high rate path may be used.

The game control unit 11 returns to Step S25 of FIG. 12, after finishing the processing of Step S30. And, the game control unit 11 executes the processing described above, in Step S25. Through the execution of the routine of FIG. 12, the path W on which each object 60 corresponding to each operation timing should be arranged is determined. Further, between both game machines 2 during the play using the same music having the different difficulty levels, according to the predetermined reflection condition, the operation result of one of the game machines is reflected to the game screen of the other.

As described above, according to this embodiment, between the one game machine and the other game machine, the operation information of one of game machines is reflected to the game screen 50 of the other, using the predetermined reflection condition. Further, as an example of the predetermined reflection condition, there is used the ratio of number of the operation timings. That is, it is possible to try to adjust the difference of the difficulty level, according to number of the operation timings. Due to this, it is possible to actualize the play between both game machines 2 in which number of the operation timings to be operated is different from each other. In other words, it is possible to use the pieces of music with the different difficulty levels from each other, between the one game machine and the other game machine.

Further, it is possible to expand the target of the opponent, since it is possible to actualize the play using pieces of music with the different difficulty levels. Due to this, it is possible to increase opportunities of the play, and, for example, it is possible to actualize the play with friends having the different play levels in which the play is not made normally. Accordingly, it is possible to improve the interest of the game.

In the above-described embodiment, the control unit 10 functions as a music reproduction device. Further, the control unit 10 functions as a reference timing teaching device, a game region presenting device, a mark display control device, and a condition determination device, by executing the routine of FIG. 11, FIG. 12, and FIG. 13 through the game control unit 11. Furthermore, the control unit 10 functions as an other machine information acquiring device, by executing the routine of FIG. 10 through the game control unit 11.

The present invention is not limited to the above-described embodiment and can be implemented in appropriate embodiments. In the above-described embodiment, there is employed the miss operation as the specific kind of act. However, the specific kind of act is not limited to such an embodiment. For example, various kinds of operations indicating the paths W1, W2, and W3 may be employed as the specific kind of act.

In addition to the object 60, other operation indication marks may be displayed in the game. For example, when a predetermined display condition has been met (for example, a case in which a predetermined operation is performed, a case in which a predetermined score is obtained, a case in which a predetermined option is acquired, or the like meet this condition), a special object may be displayed as the one of such operation indication marks. Further, when the special object is displayed on the other game machine, a special object may be also displayed on the one game machine as operation reference mark corresponding to any one of the reference portions. And, the operation information to the special object of the other machine may be reflected directly to the special object corresponding to this which is displayed in the one machine, separately from the predetermined reflection condition. In other words, the moving path of special operation indication mark in the one game machine may be changed according to the operation information to the special object in the other game machine. Due to this, it is possible to use the special operation indication mark as a means capable of directly reflecting the one operation information to the other.

Further, in the above-described embodiment, as the difference of contents between pieces of reference timing data, there is employed number of the reference timings. However, the difference of contents between pieces of reference timing data is not limited to the embodiment like this. The differences such as a difference in which number of the reference timings is same but the moving velocity of the displayed reference indication marks corresponding to the reference timings is different from each other, a difference in which the reference timing itself is difference from each other, or the like may be employed as the difference of contents between pieces of reference timing data. And, in these cases, for example, number according to velocity ratio, or the like may be used as the predetermined number used to the predetermined reflection condition.

Further, in the above-described embodiment, between the one game machine and the other game machine, there are executed same games having the different difficulty levels. However, the game played on the game machines 2 is not limited to the game like this. The game having completely different rule or contents may be played between the one game machine and the other game machine, as long as the one play act is reflected to the progress of the other game according to the predetermined reflection condition.

In the above-described embodiment, on the game machines 2, there is played the music game. However, the game played on the game machines 2 is not limited to the embodiment like this. For example, as the other games, a RPG (role-playing game), an action game, a sports game, a shooter game, or the like may be played on the game machine 2. Further, in the above-described embodiment, the game machine 2 is applied to the game system in which the center server 3 exists between the game machines 2. However, the game system to which the game machine of the present invention is applied is not limited to the embodiment like this. For example, the center server 3 may be omitted. That is, the game machine may be applied to the game system configured by two game machines connected with each other through a communication line. Furthermore, the game machine of the present invention may be actualized in appropriate embodiments such as an arcade game machine installed in commercial facility, a stationary game machine for home use, a portable game machine, or the like.

What is claimed is:

1. A game machine which is applied to a game system progressing a game between a plurality of terminals connected through a communication line, based on play acts by a player of each terminal, and which is capable of functioning as one of the plurality of terminals, wherein the game machine comprising:

a reference timing data storage device adapted and configured to store two or more pieces of a reference timing sequence in which reference timings at which the play acts should be performed in the game are described so that contents of the reference timings differ from each other;

a reference timing teaching device adapted and configured to teach the reference timings for own game machine, based on a piece of the reference timing sequence differing from a piece of the reference timing sequence used in another game machine functioning as another terminal of the game system, among the two or more pieces of reference timing sequence, wherein the reference timing sequence of the game machine correspond to a first difficulty level of the game and the reference timing sequence of the other game machine correspond to a second difficulty level of the game that is different than the first difficulty level, and wherein the reference timing sequence used in the game machine corresponds to a movement of a first number of objects reflected across a screen of the game machine, and the reference timing sequence used in the other game machine corresponds to a movement of a second number of objects reflected across a screen of the other game machine;

an other machine information acquiring device adapted and configured to acquire other machine information relating to the play acts on the other game machine; and a condition determination device adapted and configured to determine paths of the first number of objects reflected on the screen of the game machine and whether or not a predetermined reflection condition in which the other machine information in the other game machine should be reflected to the screen of the game machine has been met based on the other machine information acquired by the other machine information acquiring device, and wherein the reference timing teaching device reflects the other machine information to a teaching aspect for teaching the reference timings for the own game machine, when the predetermined reflection condition has been met based on a determination result of the condition determination device.

2. The game machine according to claim 1, wherein the two or more pieces of reference timing sequence differ from each other, due to a difference of number of the described reference timings.

3. The game machine according to claim 2, wherein
the play acts include two or more kinds of acts,
the condition determination device determines that the predetermined reflection condition has been met when number of specific kind of acts reaches at a predetermined number, based on the specific kind of acts among the two or more kinds of acts included in the other machine information.

4. The game machine according to claim 3, wherein number according to a ratio between number of the reference timings described in the piece of the reference timing sequence used in the own game machine and number of the reference timings described in the piece of the reference timing sequence used in the other game machine is used as the predetermined number.

5. The game machine according to claim 4, wherein acts of a case in which each play act is not executed by each player within predetermined time, or an inappropriate case as each play act are used as each specific kind of act.

6. The game machine according to claim 3, wherein acts of a case in which each play act is not executed by each player within predetermined time, or an inappropriate case as each play act are used as each specific kind of act.

7. The game machine according to claim 1, wherein
the play acts include two or more kinds of acts,
the condition determination device determines that the predetermined reflection condition has been met when number of specific kind of acts reaches at a predetermined number, based on the specific kind of acts among the two or more kinds of acts included in the other machine information.

8. The game machine according to claim 7, wherein number according to a ratio between number of the reference timings described in the piece of the reference timing sequence used in the own game machine and number of the reference timings described in the piece of the reference timing sequence used in the other game machine is used as the predetermined number.

9. The game machine according to claim 8, wherein acts of a case in which each play act is not executed by each player within predetermined time, or an inappropriate case as each play act are used as each specific kind of act.

10. The game machine according to claim 7, wherein acts of a case in which each play act is not executed by each player within predetermined time, or an inappropriate case as each play act are used as each specific kind of act.

11. The game machine according to claim 1, further comprising:
an input apparatus including at least one operation unit for inputting the play acts; and
a display apparatus that displays a game screen, wherein
the reference timing data storage device stores two or more pieces of sequence data in which operation timings for the one operation unit are described as the reference timings so that contents of the operation timings differ from each other, as the two or more pieces of reference timing sequence,
the other machine information acquiring device acquires operation information for the one operation unit of the other game machine, as the other machine information,
the condition determination device determines whether or not the predetermined reflection condition has been met based on the operation information acquired by the other machine information acquiring device, wherein
the reference timing teaching device comprises;
a game region presenting device adapted and configured to display a game region to which a plurality of reference portions arranged apart from each other are set, on the game screen, and
a mark display control device adapted and configured to teach the operation timings, by displaying operation indication marks for indicating the operations on the one operating unit while moving the operation indication marks in the game region so that each operation indication mark arrives at least one of the plurality of the reference portions along any one of moving paths connecting the reference portions with each other at each operation timing indicated by a piece of the sequence data differing from a piece of the sequence data used in the other game machine, and wherein
the mark display control device reflects the operation information of the other game machine to a teaching aspect for teaching the own operation timings, by using the operation information of the other game machine for selecting at least one moving path of at least one operation indication mark to be displayed on the own game machine when the predetermined reflection condition has been met, based on a determination result of the condition determination device.

12. The game machine according to claim 11, wherein when a special operation indication mark displayed at a case in which a predetermined display condition has been met is displayed on the game screen of the other game machine as the operation indication mark, the mark display control device displays the special operation indication mark on the game screen of the own game machine as the operation indication mark corresponding to any one of the operation timings, and reflects the operation information for the special operation indication mark on the other game machine to the special operation indication mark on the own game machine, separately from the predetermined reflection condition.

13. The game machine according to claim 1, further comprising:
an audio output apparatus that reproduces and outputs a sound;
a music data storage device adapted and configured to store music data used to reproduce music; and
a music reproducing device adapted and configured to reproduce the music through the audio output apparatus based on the music data, and wherein timings in the music are used as the reference timings.

14. A control method of controlling a computer incorporated into a game machine which is applied to a game system progressing a game between a plurality of terminals connected through a communication line, based on play acts by a player of each terminal, which is capable of functioning as one of the plurality of terminals, and which comprises a reference timing data storage device adapted and configured to store two or more pieces of a reference timing sequence in which reference timings at which the play acts should be performed in the game are described so that contents of the reference timings differ from each other, and wherein the control method of controlling the computer comprises the steps:
a reference timing teaching step that teaches the reference timings for own game machine, based on a piece of the reference timing sequence differing from a piece of the reference timing sequence used in another game machine functioning as another terminal of the game system, among the two or more pieces of reference timing sequence, wherein the reference timing sequence of the game machine correspond to a first difficulty level of the game and the reference timing sequence of the other game machine correspond to a second difficulty level of the game that is different than the first difficulty level, and wherein the reference timing sequence used in the game machine corresponds to a movement of a first number of objects reflected across a screen of the game machine, and the reference timing sequence used in the other game machine corresponds to a movement of a second number of objects reflected across a screen of the other game machine;

an other machine information acquiring step that acquires other machine information relating to the play acts on the other game machine; and a condition determination step that determines paths of the first number of objects reflected on the screen of the game machine and whether or not a predetermined reflection condition in which the other machine information in the other game machine should be reflected to the screen of the game machine has been met based on the other machine information acquired by the other machine information acquiring device, and wherein the reference timing teaching step further includes a step that reflects the other machine information to a teaching aspect for teaching the reference timings for the own game machine, when the predetermined reflection condition has been met based on a determination result of the condition determination device.

15. A non-transitory computer readable storage medium storing a computer program for a game machine which is applied to a game system progressing a game between a plurality of terminals connected through a communication line, based on play acts by a player of each terminal, which is capable of functioning as one of the plurality of terminals, and which comprises a reference timing data storage device adapted and configured to store two or more pieces of a reference timing sequence in which reference timings at which the play acts should be performed in the game are described so that contents of the reference timings differ from each other, and wherein the computer program for the game machine is configured so as to cause a computer which is incorporated into the game machine to function as:

a reference timing teaching device adapted and configured to teach the reference timings for own game machine, based on a piece of the reference timing sequence differing from a piece of the reference timing sequence used in another game machine functioning as another terminal of the game system, among the two or more pieces of reference timing sequence, wherein the reference timing sequence of the game machine correspond to a first difficulty level of the game and the reference timing sequence of the other game machine correspond to a second difficulty level of the game that is different than the first difficulty level, and wherein the reference timing sequence used in the game machine corresponds to a movement of a first number of objects reflected across a screen of the game machine, and the reference timing sequence used in the other game machine corresponds to a movement of a second number of objects reflected across a screen of the other game machine;

an other machine information acquiring device adapted and configured to acquire other machine information relating to the play acts on the other game machine; and a condition determination device adapted and configured to determine paths of the first number of objects reflected on the screen of the game machine and whether or not a predetermined reflection condition in which the other machine information in the other game machine should be reflected to the screen of the game machine has been met based on the other machine information acquired by the other machine information acquiring device, and wherein the computer program for the game machine is configured so as to cause the reference timing teaching device to further function as a device adapted and configured to reflect the other machine information to a teaching aspect for teaching the reference timings for the own game machine, when the predetermined reflection condition has been met based on a determination result of the condition determination device.

* * * * *